United States Patent
Zimmermann et al.

(10) Patent No.: US 7,188,541 B2
(45) Date of Patent: Mar. 13, 2007

(54) TRANSMISSION MECHANISM COMPRISING A SHIFTING DEVICE

(75) Inventors: Martin Zimmermann, Sasbach (DE); Holger Stork, Bühl (DE); Georg Schneider, Bühl (DE); Klaus Henneberger, Bühl (DE); Martin Eckert, Achern (DE); Gunter Hirt, Kongsberg (NO); Thomas Jäger, Meckenbeuren (DE); Martin Vornehm, Bühl (DE); Volker Kretz-Busch, Bruchsal (DE); Reinhard Berger, Bühl (DE)

(73) Assignee: LuK Lamellen und Kupplungsbau Beteiligungs KG, Bohl (DE)

( * ) Notice: Subject to any disclaimer, the term of this patent is extended or adjusted under 35 U.S.C. 154(b) by 0 days.

(21) Appl. No.: 11/390,530

(22) Filed: Mar. 27, 2006

(65) Prior Publication Data
US 2006/0162476 A1    Jul. 27, 2006

Related U.S. Application Data

(60) Division of application No. 10/701,866, filed on Nov. 6, 2003, now Pat. No. 7,051,609, which is a division of application No. 09/995,401, filed on Nov. 27, 2001, now Pat. No. 6,695,747, which is a continuation of application No. PCT/DE00/01685, filed on May 25, 2000.

(30) Foreign Application Priority Data

May 27, 1999  (DE)  ................................. 199 24 225

(51) Int. Cl.
*F16H 63/02*  (2006.01)

(52) U.S. Cl. ...................................................... 74/335
(58) Field of Classification Search ................... 74/335
See application file for complete search history.

(56) References Cited

U.S. PATENT DOCUMENTS

| | | | | |
|---|---|---|---|---|
| 4,621,328 | A * | 11/1986 | Arai et al. ..................... | 74/335 |
| 4,718,307 | A * | 1/1988 | Yabe et al. .................... | 74/335 |
| 5,219,391 | A * | 6/1993 | Edelen et al. ................. | 74/335 |
| 5,305,240 | A * | 4/1994 | Davis et al. .................. | 74/335 |
| 5,370,015 | A * | 12/1994 | Moscatelli ................... | 74/335 |
| 5,867,092 | A * | 2/1999 | Vogt ............................ | 74/335 |
| 6,301,537 | B1 * | 10/2001 | Walker ........................ | 74/335 |
| 6,722,219 | B2 * | 4/2004 | Berger et al. ................. | 74/335 |

* cited by examiner

*Primary Examiner*—Sherry Estremsky
(74) *Attorney, Agent, or Firm*—Alfred J. Mangels

(57) ABSTRACT

A transmission system including a shift mechanism for operating and controlling the transmission system. To automatically detect geometric characteristic values of the transmission system or of the shifting device a selector motor and a shift motor actuate a select or finger that is displaceably mounted in a selection-shift-passageway layout. Starting from an initial position whose coordinates within the selection-shift-passageway layout are unknown, the selector finger is displaced in the directions of shifting and in the directions of selection in order to detect paths of movement in the direction of selection or shifting. The selector finger is repeatedly displaced to establish the maximum paths of movement until the predetermined transmission geometric characteristic values are completely detected. Also disclosed are a control device for controlling a transmission system that includes a shift mechanism, and a method for controlling such a transmission system.

58 Claims, 10 Drawing Sheets

TRANSMISSION MECHANISM COMPRISING A SHIFTING DEVICE

CROSS-REFERENCE TO RELATED APPLICATIONS

This application is a division of U.S. application Ser. No. 10/701,866, filed on Nov. 6, 2003, now U.S. Pat. No. 7,051,609, which is division of U.S. application Ser. No. 09/995,401, filed on Nov. 27, 2001, now U.S. Pat. No. 6,695,747, which is a continuation of International Application No. PCT/DE00/01685, filed on May 25, 2000, and in which the U.S. was designated.

BACKGROUND OF THE INVENTION

1. Field of the Invention

The invention relates to a transmission system with a shift mechanism for controlling the transmission system, a control device for controlling a transmission system with a shift mechanism, a method for controlling such a transmission system or shift mechanism, as well as an application for the transmission system.

2. Description of the Related Art

In order to shift various gears in a transmission system, particularly an automated shift transmission, shift mechanisms are used. The shift mechanisms include a shift motor and a selection motor, wherein the motors control a selector finger, which is moved in an arrangement including a selection passageway and various shift passageways. The shift passageways are thereby allocated to predetermined gears, so that within a shift passageway there exists one position in which a predetermined gear of the transmission is fully engaged. Through an appropriate mechanism with shift forks, the movement of the selector finger is transmitted to gearshift rings. A selector shaft that is coupled with the selector finger is controlled by the motors in such a way that it can execute swiveling movements around its axis as well as axial movements. The swiveling or linear movements are changed into shift movements or movements of the gearshift rings.

Those movements, or especially the movements of the motors, are tracked by displacement and/or angle sensors. They are designed specifically as incremental displacement sensors, hence as sensor devices that detect a position by adding up individual increments along a linear section or an angle.

Such shift mechanisms have proven useful, particularly for controlling automated shift transmissions. The use of incremental displacement detection devices has frequently led to cost savings compared with the use of absolute displacement detection devices.

Nevertheless, it would be desirable to further improve those known transmission systems having shift mechanisms, particularly with regard to their reliability and shifting accuracy.

Particularly when incremental displacement detection devices are used, there is a risk of incorrect shifts, which, apart from a loss of comfort, can cause delayed shift procedures or damage to the transmission or the shift mechanism.

It is therefore desirable to be able to accurately determine or check the current position of the selector finger or to be able to perform a position alignment or position adjustment, even when information from a position-sensing device is lost or inaccurate. Furthermore, it would be desirable for position errors encountered during the detecting or controlling of the selector finger to be detected as quickly and as safely as possible, and substitute measures introduced for their elimination.

A secure adaptation of predetermined positions, such as particularly the gear end positions, at a predetermined point in time would also be desirable.

The invention is therefore based on the object of producing an improved transmission system with a shift mechanism, and a method for controlling the same, along with a control device for controlling the actuation device of the same, which will reduce the probability of incorrect shifts, transmission damage, functional impairment, and failure, and through which the possibility of improved driving comfort is produced.

SUMMARY OF THE INVENTION

In accordance with the invention, a transmission system with a shift mechanism for its actuation is proposed, whereby the shift mechanism has an arrangement for automatically determining at least one predetermined parameter, from which, starting from an unknown selector finger position, that is, especially an unknown position within the selection-shift-passageway device, the parameter can be determined.

It should be noted that in all embodiments in this application the transmission system is preferably formed as an automated transmission (ASG) of a motor vehicle. It should further be noted that the embodiments of the invention are explained particularly in reference to a shift mechanism designed to actuate a transmission system, however that should not represent a limitation of the invention of the shift mechanism. The invention also extends particularly to a transmission system having features in accordance with the invention.

The shift mechanism has a selection-shift-passageway layout. Within the framework of this application, a selection-shift-passageway layout should be particularly understood as an arrangement of at least one selection passageway and at least one shift passageway. In this selection-shift-passageway layout or in this shift diagram a first shift element, which is specifically a selector finger, is movable. It should further be noted that within the framework of this application a shift passageway should be understood particularly as a passageway that is arranged in a certain position in the selection direction. In particular, passageway portions that extend on different sides of the selection passageway and are arranged in a specific position in the selection direction are designated as a shift passageway. In particular, those different passageways are also designated as a shift passageway.

It should be noted that the term "selector finger," to which reference is made within the framework of this disclosure, should be understood in a broad sense. In the sense of the claims, the term selector finger should for that reason be understood generally as a shift element.

The selector finger is controlled by an actuation device, which especially has a selection motor and a shift motor. The selector finger is controllable by the selection motor in the selection direction, that is, in the direction that is determined by the longitudinal direction of the selection passageway. Correspondingly, the selector finger is controllable by the shift motor in the shift direction, that is, in the direction that is determined by the longitudinal direction of the shift passageway.

An actuation device in the sense of this application is especially to be understood to be a device that has at least one motor, especially an electric motor. In particular, the actuation device has a selection motor and a shift motor, whereby those motors control particularly a movement of the selector finger and/or a selector shaft in different directions.

A position sensor detects the selector finger movement or the selector shaft movement or the motor movement, that is, especially the movement of a selection motor and a shift motor.

It should be noted that the term position sensor or passageway measuring device should be understood within the framework of this invention in a broad sense, and includes especially a device for detecting a passageway length and a device for detecting a (traversed) angle and/or a position. Furthermore, this term extends both to an absolute position sensor as well as to an incremental position sensor. The position sensor is preferably formed as an incremental angle sensor, whereby in a particularly preferred embodiment an angle sensor mechanism is arranged on or in the selection motor or in its vicinity, and on or in the shift motor or in its vicinity, respectively. It is also preferred that a selection motor controls an axial movement of a selector shaft, and a shift motor controls a rotational or swiveling movement of the selector shaft, whereby an incremental angle sensor detects the swiveling movement and a passageway sensor for detecting a longitudinal movement of the translatory movement.

A passageway sensor, within the framework of this application, should be understood particularly as a sensor that detects an angular or swiveling movement, or a sensor that detects a translatory motion, or a sensor that detects a displacement distance. The passageway sensor is designed especially as an incremental passageway sensor.

The shift mechanism preferably has a second shift element, that is preferably formed as a selector shaft. It should be noted that for the purpose of simplifying the explanation of the invention, reference is made in the following to a selector shaft, whereby instead of a selector shaft a differently designed shifting element can also be utilized.

With the device for automatically establishing at least one predetermined parameter of the shift mechanism, that respective parameter can be determined independently from knowledge of the starting position of the selector finger in the selection-shift-passageway layout. Hereunder, it is especially to be understood that with this device the determination of the parameter can also be made possible when at the starting point of this determination process no information, or no sufficiently accurate information, is available about the current position of the selector finger within the selection-shift-passageway layout. In that way, parameters, preferably geometric parameters, can also then be determined when the position sensor produces incorrect or no values as to the current (starting) position of the selector finger.

The detectable transmission parameters can basically be arbitrary, predetermined parameters of the transmission system and/or the shift mechanism and/or a control device for controlling the shift mechanism. In particular, the transmission parameters describe the alignment, the position, the width, or the length of a shift passageway or the selection passageway, or at least the course of the passageway walls. A further example of such a parameter is represented by a predetermined position within the selection-shift-passageway layout, whose absolute position is known. In that manner, particularly predetermined coordinates can be assigned to a predetermined point by a reference characteristic, so that when that point is reached, the relative positions of other points within the selection-shift-passageway device become known again, in accordance with the reference characteristic. The predetermined parameter can particularly also be the position of a force-free gear end position within the shift passageways, or the position of the selector finger at an engaged neutral gear. The operability of the position sensor or the actuation device or their motors can also be considered to be a parameter. A further example of such a parameter is represented by the position of a selector shaft. The parameter can particularly be a predetermined point or a distance measurement, or the identity of a gear stage. It should be noted that this specification of examples of parameters does not limit the parameters that can be considered.

In accordance with an especially preferred embodiment of the invention, in accordance with a predetermined characteristic value a geometric-parameter-determining device moves into a predetermined reference position within the selection-shift-passageway layout, whereby the starting position of the selector finger can be unknown. It should be noted that herein movement should be understood that the selector finger is moved into a predetermined position. Starting from that predetermined position, which particularly represents a geometric parameter, in accordance with a second predetermined characteristic value predetermined geometric parameters can be detected or from the selector finger predetermined positions for detecting predetermined geometric parameters can be run.

It should be noted that the starting position in particular can also be estimated. The first characteristic value can particularly be based on the analysis of predetermined parameters, such as especially the movement passageway or the like, which are controlled starting from current positions.

It should be noted that, in accordance with the invention, predetermined parameters are preferably detected, from which corrected values can be generated by addition and/or multiplication and/or other operations, and/or as a function of experimental values, or by other ways. In accordance with a predetermined characteristic value corrected values can be produced that can then be further utilized as transmission geometric parameters. It is also preferred in accordance with the invention that the transmission geometric parameters are determined indirectly.

In accordance with a particularly preferred embodiment of the invention, the selector finger can be controlled and/or moved by the device for establishing predetermined transmission geometric parameters in the selection direction and/or in the shift direction, starting from the unknown selector finger position, so that the existing movement passageways of the shift finger in the selection and/or shift direction near the unknown shift finger position can be determined. Subsequently, the device for detecting predetermined transmission geometric parameters can then evaluate the results of those possibilities for motion in the shift and/or selection direction. Within the framework of this evaluation it is preferred that additional parameters are consulted. Those additional parameters or data or information are particularly stored in a storage device. The evaluation takes place particularly in accordance with a predetermined evaluation characteristic. Based upon the result of that evaluation and/or other parameters or information that have/has already been determined or are/is known, a predetermined new position for the shift finger is subsequently approached, in accordance with a predetermined characteristic value. In particular, the end point that is to be approached is established whereby the movement toward that position results from detecting by touch and/or in accordance with a predetermined passageway. It is preferred that a new position is controlled iteratively.

The values that have been determined through the respective method or by determining the respective movement passageways are especially directly supplied to an evaluation. It is also preferred that they be processed and/or modified by addition or multiplication operations, or the like, or on the basis of experimental values, corrective values, or the like, before being brought up for further evaluation.

The steps of controlling a position, determining the movement passageway starting from that position, as well as the evaluation of the determined movement passageways, especially to control a new predetermined position, are repeated by the device for detecting the predetermined geometric parameters, preferably so long until the predetermined transmission geometric parameters have been completely detected.

In accordance with a particularly preferred embodiment of the invention, at least one of the neutral gear positions and/or at least one of the synchronous positions and/or at least one passageway position and/or passageway width is included in those transmission geometric parameters.

It is particularly preferred that, at least part of the time, predetermined stops and/or predetermined walls of the selection passageway and/or the shift passageways are started by the transmission geometric parameter detecting device, or a corresponding start is implemented by a method, whereby the passageway wall and/or the stop are detected indirectly. For indirect detection, various methods can be considered. Particularly, predetermined parameters or operating parameters can be used, or the impact against a passageway wall or on a stop device can be detected based upon the time history. In particular the selection and/or the shift motor can be controlled in such a way that it is supplied with a predetermined velocity (rotational speed), a predetermined acceleration (angular acceleration), a predetermined force (moment), an iterative movement with a predetermined passageway (angular position), a movement with random displacement guideline (angular position), and/or a predetermined voltage and/or a predetermined current, or another predetermined movement, or a combination of the above-mentioned movements when the shift finger can proceed freely. When it strikes a stop device, those values change.

An analysis of the stop can particularly result from the detection and/or the analysis of the sliding sleeve passageway and/or the sliding sleeve velocity and/or the sliding sleeve acceleration and/or a passageway at any random position in the space between the E-motor, thus especially the selection and/or the shift motor, and the shift finger and/or a velocity at a random position in the space between the E-motor and the shift fork and/or an acceleration at a random position in the space between the E-motor and the shift fork and/or a shift force measurement at a random position in the space between the E-motor and the shift fork and/or the angular position of the motor and/or the motor rotational speed and/or the angular acceleration of the motor and/or the motor voltage and/or the motor current and/or a target and the actual value comparison of the position controller and/or the axial position of the transmission shaft and/or the axial velocity of one or several transmission shafts and/or the axial acceleration of one or several transmission shafts and/or the angular position of one or several transmission shafts and/or the angular speed of one or several transmission shafts and/or the angular acceleration of one or several transmission shafts and/or the transmitted torque of one or several transmission shafts and/or the torque transmitted by the transmission and/or a random combination of the above-named values.

In accordance with the invention, the shift mechanism is provided with a device for determining and/or checking and/or fine-tuning the neutral position of the transmission. Such a device enables the neutral position to be located. In order to locate that neutral position, the device for determining and/or checking and/or fine-tuning the neutral position of the transmission controls the selector finger in such a way that it passes at least once beyond a predetermined length or a predetermined region in the selection direction. The selector finger is subsequently controlled in such a way that it approaches a wall that is aligned in the longitudinal direction of the selection passageway by at least one increment, that is, by a predetermined very small distance, in the shift direction, or assumes a new position in the shift direction. The selector finger is subsequently moved again over a predetermined distance in the selection direction, preferably over the entire length of the selection passageway, before it is again moved incrementally in the shift direction. The orientation when sliding in the shift direction corresponds to the orientation that existed during the previous sliding movement in the shift direction. In that way, an approach to one of the selection passageway walls extending in the longitudinal direction takes place for so long until the selector finger is diverted into the selection direction by an approach in the shift direction. That deflection can be considered an indication that the selector finger has reached a stop device or a protrusion, or the like, of the longitudinal wall of the selection passageway wall, while sliding in the selection direction.

In that way the position of the longitudinal wall can be determined, thus allowing the selector finger to be moved over the entire length of the selection passageway, unhindered by stops or the like.

The position of the wall is then correspondingly determined for the opposite longitudinal wall of the selection passageway. To accomplish that, the selector finger can particularly be moved back to its starting position because, as a result of the incremental approach toward the first wall of the selection passageway, it is clear that the second, opposite wall of the selection passageway does not lie in that traveled region.

Based on such positions of the walls of the selection passageway, the neutral position can be determined in accordance with a predetermined characteristic value, particularly by establishing the mean value of the coordinates in the shift direction.

In accordance with a particularly preferred embodiment of the invention, the selector finger is shifted in incremental approaches not over the entire length of the selection passageway, but instead over predetermined partial lengths in the selection direction.

This makes it possible, in particular, for different sections of the longitudinal wall of the selection passageway to be differentiated with regard to their coordinates in the shift direction.

Since the precise position of the individual wall sections is then known, it is possible to select more direct passageways when shifting between various shift passageways, without running the risk of the selector finger striking a wall during shifting.

In accordance with the invention, the gear end positions can also be determined in a corresponding manner. Furthermore, the shift passageways can be measured in this way. In particular, the shift passageway widths can be determined. It should be noted that this measurement using the above-mentioned device and/or the above-mentioned method can be performed by exchanging the selection and shift passageways and/or the selection direction and shift direction.

However, since the shift passageways each open into the selection passageway, this is preferably taken into account in accordance with a predetermined characteristic value.

Specifically, two shift passageways and/or shift passageway sections located across the selection passageway are treated as a unit, so that the selector finger is moved from a shift passageway section through the selection passageway into an oppositely-facing shift passageway and/or an oppositely-facing shift passageway section in the above-described manner. It is also preferred that the length of the respective shift passageway is determined initially, and that this length is subsequently taken into consideration in the movement path in the shift direction. The length of the shift passageway can be determined especially by moving the selector finger in the shift direction, and simultaneously actuating the selection motor. With the position sensing device it is possible to monitor when the position value changes by more than a predetermined amount in the selection direction. The measurement value for the shift position at that location represents an end of the shift passageway. Starting from this point, the selector finger is moved in the direction of the shift passageway until it strikes the end stop, so that the difference in length represents the shift passageway length. It is also possible to start this process at the end stop in the shift passageway.

This characteristic feature provides for the fact that a shift mechanism has an absolute position detection device. Starting from an unknown position of the selector finger and/or an unknown position of the selector shaft, in terms of the coordinates within the selection-shift-passageway layout, this absolute position detection device allows an absolute position in the selection direction and/or shift direction to be determined.

An absolute position in the shift direction and/or selection direction in accordance with this application should be understood as a position whose location is clearly established within the selection-shift-passageway layout. In particular, the absolute position relative to the selection-shift-passageway layout is established in the same way that a marking would be established at the base of this layout. Preferably this absolute position is independent from wear that occurs on the passageway walls.

It should be noted that the process of determining and/or detecting this absolute position in accordance with this application is considered an absolute alignment. An absolute alignment is preferably performed in an event-controlled manner or at predetermined time intervals in order to set an increment counter at a predetermined starting value, such as zero.

In this manner, errors in the sensor system, factors that interfere with measurement signals, and defective evaluations that can lead to summing and thus position errors can be prevented from being perpetuated. Furthermore, the effects of a loss of absolute position, especially due to defective storage of the position or a resetting of the controls or other malfunctions, can be compensated for.

In accordance with a particularly preferred embodiment of the invention, the absolute position detection device is designed such that the absolute position of the selector shaft and/or the selector finger can be determined basically independently from the actuation forces of the shift mechanism. In particular, it is preferred that the absolute position can be determined independently from the value of the forces that are applied by the actuation device, and especially by its motors.

It is preferred that, regardless of the value of the forces applied to the selector finger, the identical absolute position can be determined, and/or an identical position can be produced as the absolute position.

In accordance with a particularly preferred embodiment of the invention, the shift mechanism and/or the absolute position detection device has at least one sensor device and at least one signal field. This signal field can be scanned by the sensor device. In a preferred embodiment, the sensor device is designed as a digital sensor and/or the signal field is designed as a digital sensor field.

The signal field is arranged on the surface of the selector shaft. The signal field is formed especially by surface elevations and/or recesses in the selector shaft.

The signal field corresponds to a pattern that contains a plurality of field-configured regions and is projected into the selection-shift-passageway layout. Each of those areas is assigned a predetermined signal (of the signal field).

When crossing and/or detecting a boundary between two areas that correspond to different signal values, the sensor detects a signal and/or the signal value changes.

In a preferred embodiment, the absolute position detection characteristic controls the selector finger movement in accordance with a predetermined characteristic value. In a particularly preferred embodiment, this characteristic value is based upon the formation of the sensor field and/or the pattern. The characteristic value is designed such that the selector finger is initially controlled in one direction, in which an absolute position can be safely determined in accordance with the pattern, independent of the selector finger position.

The invention is beneficial in that it makes it possible to perform an absolute alignment using a single sensor; however, several sensors can also be provided. It is also particularly preferred to use a digital sensor and/or switch on the selection motor and a digital sensor and/or switch on the shift motor. The usage of a digital switch on the selector shaft in particular makes it possible to use only a single switch and/or sensor rather than one switch per motor. A shift mechanism with both a sensor field and a sensor, in accordance with the invention, offers the additional advantage that the absolute position can be determined rapidly, with a high degree of accuracy, but with little effort and at low cost. Furthermore, in accordance with the invention, it is possible to perform the absolute alignment in any convenient gear stage.

The invention is also beneficial in that the absolute position can be determined independently from the elasticity of the shift mechanism, especially from the elasticity of stops, e.g., passageway walls, or the elasticity of an actuation device, especially of a motor.

The influence of measuring inaccuracies can be reduced considerably and/or eliminated in accordance with the invention. Furthermore, it is beneficial that the wear of components has no influence on the determination of position.

In a particularly preferred embodiment the signal field is arranged on the selector shaft.

In accordance with a preferred embodiment of the invention, the direction in which the selector finger is moved during a digital change and/or in which direction (from digital signal 0 to digital signal 1 or from digital signal 1 to digital signal 0) the digital change takes place is taken into consideration when determining the absolute position.

It is preferred that the pattern and/or the signal field is designed in such a way that the absolute position in the shift direction and in the selection direction can be clearly determined within two movements of the selector finger. In a particularly preferred embodiment, the absolute position in the shift direction and in the selection direction can be clearly determined within a maximum of three movements of the selector finger.

A movement is specifically a movement of the selector finger between a starting point and an ending point, between which the orientation and direction of travel are maintained.

In a particularly preferred embodiment, the field-configured regions of the pattern projected onto the selection-shift-passageway layout are aligned largely parallel to the axes of the passageways, i.e., the shift passageways and/or the selection passageway.

The sensor mechanism is preferably equipped with at least one sensor, preferably precisely one sensor, which can comprise an electromagnetic feeler, a Hall effect sensor, an inductive sensor, an optical sensor, a capacitive sensor, a sound sensor system, a track-tapping electrical collector, or some similar device, or a combination of the above.

In a preferred embodiment, the shift mechanism has an evaluation device, which assigns a predetermined position in the selection direction and/or shift direction to predetermined digital changes based upon a predetermined characteristic value. The pattern is preferably also stored in this evaluation device. In accordance with a particularly preferred embodiment of the invention, the pattern is designed such that in at least one shift passageway two regions, which represent different sensor signals, meet with a contact line that runs at least partially in the shift direction. It is also preferred that within the shift passageway those regions meet a contact line that runs crosswise to the longitudinal axis of the shift passageway.

It is particularly preferred that within the selection passageway two regions, to which different sensor signals are assigned, meet with a contact line that runs at least partially in the longitudinal direction of the selection passageway. It is also preferred that within the selection passageway those regions meet a contact line that runs at least partially crosswise to the longitudinal direction of the selection passageway.

In a preferred embodiment at least a first region of the pattern projected onto the selection-shift-passageway layout corresponds to a first digital value, and that at least a second region corresponds to the second digital value, which is different from the first one, wherein the first region is located within the selection-shift-passageway layout, especially in a cross-shape or H-shape.

In particular, a first partial region of a cross-shaped first region extends basically across the entire length of the selection passageway. A second partial region, which crosses this first partial region, is preferably arranged across the entire length of two shift passageways, which are arranged in rows, crossing the selection passageway. In a preferred embodiment, this second partial region is arranged within the selection passageway around a position that is located between two shift passageways in the selection direction. It is preferred that in the region in which the partial regions of the first region intersect, i.e., in the region of overlap, a signal exists that corresponds to the second region. The partial regions of the first region preferably have a width that is smaller than the width of the shift passageway and/or the selection passageway.

It is also preferred that the first region is arranged in an H-shape within the selection-shift-passageway layout. Specifically, a bridge connecting the two parallel columns of the "H" extends over the entire length of the selection passageway, while the columns extend in the shift passageways and cover them partially—in terms of their width. In a preferred embodiment, the "columns" rest against the walls of the shift passageways, wherein the two columns of the "H" rest against wall areas of the shift passageway that are oriented differently in the selection direction.

It is also preferred that a first region extends in the selection direction, basically covers the selection passageway, and extends at least in part into the shift passageways, and beyond that is interrupted at a predetermined location in the selection direction so that in this region a second region exists, which extends across the entire width of the selection passageway.

The pattern is preferably designed such that the first region is arranged in a cross shape, wherein an extension of this cross—interrupted by the overlapping intersecting region—extends through the entire selection passageway, while a partial region of the cross oriented perpendicular to the above extends into two shift passageways that are located next to each other in the selection direction.

Preferably, the first region extends largely in the selection direction, covers the entire width of the selection passageway in this region, and extends further into the adjacent shift passageways in the shift direction, wherein a region that is oriented perpendicular to this partial region of the first region, which extends in the selection direction, completely covers two shift passageways that are located opposite the above region in the shift direction, wherein the overlapping region in the shift direction and in the selection direction of the first region corresponds to the digital value of the second region.

In accordance with a particularly preferred embodiment of the invention, the hysteresis, which can contain a digital switch, is taken into consideration in the evaluation device.

A shift mechanism is envisioned, which contains a selection-shift-passageway layout in which a selector finger, which can be controlled by an actuation device, can be displaced; the shift mechanism is also equipped with at least one selector shaft and at least one three-stage switch, which interacts with a component, such as the selector shaft, that can be moved during the shifting process, such that at least three different shifting modes can be differentiated or detected.

In particular, the outer surface of the selector shaft has a profile that can be sensed by the three-stage switch. The profile is designed in particular in such a way that the radial outer profiled surface contains at least three regions that differ in their distance from the central axis of the selector shaft. Those three different distance values can be detected by the switch qualitatively and/or quantitatively.

Specifically, a first profile depth is associated with the neutral position, and a second profile depth is associated with the reverse position of the transmission. The regions of the selector shaft surface that contain no recesses form a third region.

Specifically, a mechanical switch senses those surface regions to determine whether the reverse gear or the neutral gear position, or another shift position, has been assumed.

It should be noted that although the invention is explained in greater detail with reference to a mechanical switch, the usage of other switches is also covered by the invention.

The invention is beneficial in that it makes it possible to precisely detect predetermined transmission positions. Using those positions it is also possible to align an (incremental) position sensor. In accordance with the invention, a feature is provided so that when the vehicle is in the parking mode, the reverse gear is automatically engaged, so that when the reverse gear is detected by the three-stage switch, particularly during ignition, an (incremental) position sensor can be aligned. Most preferably a three-stage switch is provided, with which two predetermined transmission positions, such as the neutral gear position and the reverse gear position, can be precisely identified.

In accordance with the invention, a shift mechanism for actuating a transmission system has a redundancy sensor device for examining and/or adapting a position sensor.

The shift mechanism is preferably equipped with a selection-shift-passageway layout, in which a selector finger that is controlled by an actuation device, particularly a selection motor and a shift motor, can be displaced. The selector finger movement is tracked by a position sensor.

The redundancy sensor device can acquire and/or detect predetermined transmission positions. A characteristic correlation value correlates with predetermined positions that are detected by the position sensor to predetermined transmission parameters. Specifically, this characteristic correlation value correlates with predetermined positions of the gear end positions and the neutral position.

In a preferred embodiment in accordance with the invention, the characteristic correlation value can be checked for accuracy based upon the values that are produced by the redundancy sensor device.

In particular, the redundancy sensor device detects when the transmission assumes the gear end positions and/or the neutral position. The characteristic correlation value correlates with predetermined position values of those final positions. Those position values can be compared to the position values indicated by the position sensor in the gear end positions and/or the neutral position.

When a deviation is detected that exceeds a predetermined value, the position values can be adjusted to the characteristic correlation value.

The selector shaft is provided with a profile that contains different regions of potential with regard to the selector shaft axis. Specifically, the gear end positions and the neutral position are designed as recesses within the selector shaft. A retainer has a spring-loaded ball, which presses against the selector shaft and lies in the appropriate recesses in the "gear end position" and/or "neutral position" shift modes. The ball thus takes on a potential that differs from the potentials it assumes when it is outside of the gear end position and/or the neutral position.

Preferably, the gear end positions and/or the neutral position are assigned to the same potential profile. It is also preferred that each of those positions is assigned a potential that is specific to it alone.

In or on the retainer a sensor device and/or a switch is arranged, which tracks and/or monitors the movement of the ball, particularly in a translatory direction. In this manner, conditions in which the ball rests in the recesses on the selector shaft that are provided for the gear end positions and/or the neutral position can be recognized. The signal that is thus detected by the sensor device and/or the switch can be used to monitor the selection motor and/or the shift motor and/or the (incremental) position sensor assigned to those motors. Specifically, in the case of a characteristic correlation value that is included in a control device for controlling the actuation device, the correctness of the correlation of predetermined position values of the actuation device to predetermined transmission positions, such as a gear end position and/or a neutral position can be checked.

Thus, especially when the sensor has detected that the ball lies in a recess in the selector shaft, it is possible to check whether the values produced by the position sensor at that time correspond with those values that are assigned to a gear end position and/or the neutral position in accordance with the characteristic correlation value. If this is not the case, it indicates an error in the characteristic correlation value and/or the position sensor. In a preferred embodiment, a position value, especially the position value that is closest to the position value currently indicated by the (incremental) position sensor, is adjusted to coincide with the position value of the incremental position sensor, i.e., the characteristic correlation value is adapted.

In accordance with the invention, the shift mechanism contains a neutral reference device.

The neutral reference device allows neutral reference movement to be initiated and executed. Neutral reference movement involves a predetermined sequence of actuations by the actuation device and/or the selector and/or the shift motor and/or the selector finger, with which, starting from an unknown selector finger position, the neutral gear can be engaged, whereby missing information, such as missing information as to the position of the selector finger, can be determined via tactile and pressing processes, and their evaluation.

A tactile process is a process in which the selector finger travels in a predetermined direction until a stop is detected, and/or in which the actuation device and/or the selection motor and/or the shift motor is controlled until a stop is recognized or a maximum path has been traversed.

A pressing process is a process in which the selector finger travels in a predetermined direction until a movement of the selector finger in this direction is recognized, and/or in which the actuation device and/or the selection motor and/or the shift motor is supplied with current until a movement by the selector finger and/or the actuation device has been detected.

In accordance with the invention, when the selector finger is being controlled, predetermined selector finger movements are prevented, and/or the selector finger is controlled in such a way that predetermined movements of the selector finger, which have been established by direction and orientation, cannot occur. In particular, the invention provides that those impermissible selector finger movements and/or directions and orientations are such that it can be ensured that the selector finger will not move into predetermined, critical shift passageways during the neutral reference movement. A critical shift passageway is a shift passageway that is associated with a gear, which, when engaged by existing predetermined operating parameters, such as the r.p.m. of an internal combustion engine or the speed of the vehicle, runs the risk of damaging the transmission system.

Those critical gears are preferably established based upon predetermined, currently existing operating parameters, i.e., dynamically.

In accordance with a particularly preferred embodiment of the invention, the selector finger is controlled during a neutral reference movement by the neutral reference device only in the orientations of the selection passageway longitudinal direction and in directions having a vector component in the selection direction and a component in the shift direction, wherein the vector that is composed of those components is directed and oriented in accordance with predetermined criteria. Those predetermined criteria include, specifically, that the vector is not parallel to a vector that is oriented from a random point on the selection passageway to a random point on a critical shift passageway;

whereby only points in a selection passageway that are located outside the regions that represent an intersecting region between the selection passageway and the critical shift passageways are considered.

In accordance with a particularly preferred embodiment of the invention, the first gear and the reverse gear are established as critical gears.

The selection-shift-passageway layout is most preferably designed as a double-H shift pattern. It is also preferred that, in such a double-H pattern, the shift passageways of the first, the third and the fifth gears are arranged along the top from left to right next to one another, while the second, the fourth and the reverse gears are arranged along the bottom, i.e., across from the selection passageway, from left to right, so that first gear and reverse gear are arranged exteriorly and diametrically opposite one another.

In accordance with a particularly preferred embodiment of the invention, the neutral reference device starts a neutral reference movement when one or more initiating conditions have been detected.

A preferred initiating condition exists when during operation it is determined that different information about the engaged gear exists. Specifically, an initiating condition exists when, with an engaged clutch—based upon the r.p.m. of the internal combustion engine and the wheel revolutions—a gear is detected that does not agree with the gear that is detected at the same time based upon the position sensor. Such a situation exists especially when the actuation device has selected the wrong gear.

Another preferred initiating condition exists when—especially due to defective contacts or interference—incorrect signals are received from the incremental sensors on the transmission actuation device, which have not been identified as incorrect, so that the actuation device selects incorrect positions and/or engages incorrect gears and/or detects unexpected stops in the transmission.

Another preferred initiating condition exists when a control device for controlling the actuation device is reset or switched off temporarily—especially due to battery failure—so that the selector finger position is lost or erroneous.

Another preferred initiating condition is given when a control device for controlling the actuation device is newly installed or has been replaced.

In accordance with a particularly preferred embodiment of the invention, a neutral reference device initiates neutral reference movement only when certain operating conditions exist. Such operating conditions can be operating conditions that are representative of an intended driving mode, the interruption of which is typically not intended. In particular, a neutral reference device initiates a neutral reference movement only when it has been ensured that the vehicle, which contains a shift mechanism in accordance with the invention, is not in the kick-down operating mode.

Preferably, a neutral reference device initiates neutral reference movement only when the speed of a vehicle that has a shift mechanism in accordance with the invention falls below a predetermined speed value. It is most preferred that a neutral reference device initiates neutral reference movement only when a vehicle with a shift mechanism in accordance with the invention is standing still.

Most preferably, neutral reference movement is initiated only when predetermined throttle valve angles have been detected in a vehicle with a shift mechanism in accordance with the invention.

In accordance with a particularly preferred embodiment of the invention, the neutral reference device prevents predetermined shifting processes, especially the engaging of a gear, during neutral reference movement.

In accordance with a particularly preferred embodiment of the invention, reference movement is interrupted and/or repeated, or a shutdown is initiated, when predetermined error conditions exist.

In accordance with a particularly preferred embodiment of the invention, a neutral reference device starts the neutral reference movement under predetermined conditions. If predetermined operating conditions are detected, especially when it can be determined that neutral reference movement is not dangerous, a LR tactile process is initiated. A LR tactile process is a tactile process which is comprised of a left tactile process followed by a right tactile process. The selection motor is supplied with current in such a way that the selector finger is controlled to move to the left in the selection direction. When the selector finger reaches a stop and/or has traversed a maximum distance, the selection motor is supplied with current in such a way that the selector finger is controlled to move to the right in the selection direction.

It should be noted that the directions left (L) and right (R) represent opposite directions in the selection direction; they are allocated in the shifting pattern in accordance with a pre-established characteristic. Hereinafter, information provided about left and right refers to a double-H shifting pattern in which the first, the third and the fifth gears are arranged from left to right on one side of the selection passageway, and the second, the fourth, and the reverse gears are arranged on the other side of the selection passageway.

In the shift direction a differentiation is made between forward (F) and rearward (R) movements. Those directions are oriented opposite one another in the shift direction. The "forward" direction is oriented from the selection passageway toward the shift passageways of the first, the third and the fifth gears, while the "rearward" direction, viewed from the selection passageway, is oriented toward the shift passageways of the second, the fourth and the reverse gears.

It should be noted that the establishment of those directions shall not serve to limit the invention.

When during a LR tactile process a large width is detected and/or the stops are farther apart than a predetermined path difference, the neutral reference device concludes that the selector finger is within the selection passageway. Since the R-tactile process follows the L-tactile process, the conclusion can be made that the neutral gear is engaged at the right end.

If the LR tactile process has produced a width and/or a distance to the stops that is below a predetermined value, it can be concluded that the selector finger is in the gear passageway.

The neutral reference device then initiates a F-tactile process with simultaneous R-pressing. If no stop is detected, or if, due to the R-pressing, a movement is initiated, the neutral reference device subsequently initiates a RLR tactile process, i.e., feeling first to the right, then feeling to the left, then feeling to the right again, for monitoring purposes. In this manner the system can check whether the selector finger is actually located within the selection passageway. If a distance is detected between the stops that is greater than a predetermined distance, it is concluded that the selector finger is actually located in the selection passageway, and since the last tactile process was to the right, the selector finger is located on the right end of the selection passageway.

If during the F-tactile process with simultaneous R-pressing a stop is detected, it can be concluded that the selector finger is located in one of the shift passageways of the first, the third, or the fifth gears—based upon the above-described example of a shift pattern. This determination will also be made by the neutral reference device when the RLR tactile process produces a small distance between the stops. In both cases, a R-tactile process with a simultaneous L-pressing process is subsequently initiated. If no stop is detected or if the pressing to the left is successful, i.e., if a movement is detected, a LR-tactile process is then initiated for control purposes by the neutral reference device. If during this LR tactile process a distance is detected that is greater than a predetermined distance value, it is determined that the selector finger is located within the selection passageway, specifically at its right end.

In accordance with a particularly preferred embodiment of the invention, the neutral reference device can detect the position of the selector finger in the direction of the shift passageways upon locating the selection passageway. In this process, it is preferred that, starting from the left or the right selection passageway end, the selector finger is moved a predetermined distance in the selection direction, wherein this predetermined distance is established in accordance with a predetermined characteristic, such that the selector finger is basically positioned in the center between two shift passageways which are located adjacent to one another in the selection direction within the selection passageway. The neutral reference device then advances the selector finger in the shift direction, with a predetermined orientation, until a stop (against a passageway wall) is detected. In order to prevent slipping into one of the adjacent shift passageways, the selection position is monitored during the movement in the shift direction. If a change in the selection direction that is greater than a predetermined change is detected, then the selector finger movement is interrupted.

In accordance with a particularly preferred embodiment of the invention, the neutral reference device initiates a neutral reference movement when, after a control device has been switched on, predetermined units are operating without the benefit of predetermined parameters from the shift mechanism, such as the position of the selector finger.

In accordance with the invention, a device is provided via which the selector finger can be pressed and forced against a predetermined stop under predetermined conditions, after which the selector finger is again released by this device; the selector finger then assumes a largely force-free position, from which the transmission geometry can be locked to a predetermined parameter. In accordance with a particularly preferred embodiment of the invention, the stop is formed by a passageway wall, e.g., a shift passageway, wherein the selector finger assumes a predetermined position, which coordinates a characteristic correlation value of the device to the force-free gear end position and/or the neutral position. The force-free gear end position and/or the neutral position are the positions of the selector finger at which the gear is completely engaged, and the shift mechanism is largely stress-free.

In accordance with a preferred embodiment of the invention, the selector finger is additionally or alternatively pressed against the shift passageway wall in the end region of the shift passageway in the selection direction, forced, and then released again, preferably released in a controlled manner, wherein the selector finger assumes a predetermined position, which completes the establishment of a gear end position in accordance with a predetermined characteristic value.

The selector finger moves into the predetermined position due to the release process and/or the (elastic) restoring force.

Preferably, the shift motor and/or the selection motor is not energized during the releasing process. It is particularly preferred that the shift motor and/or the selection motor is energized less during the releasing process, in accordance with a predetermined characteristic, than when pressed against the stop and/or during the forcing process. It is most preferred for the device to perform the pressing, forcing, and releasing at predetermined time intervals and/or when predetermined conditions occur. It is also preferred for a pressing, forcing, and controlled release of the selector finger to be performed on two opposite walls within the shift passageways from time to time, in order to deduce the width of the shift passageway in accordance with a predetermined characteristic from the adjusted, force-free positions.

It is particularly preferred that the stops—especially in the above-described form—are detected by monitoring predetermined parameters and/or their progression, such as the selection motor and/or the shift motor voltage.

In accordance with a particularly preferred embodiment of the invention, a position sensor is monitored and/or the corresponding position values are adapted based upon the established force-free positions and/or the neutral positions and/or the positions that arise after the releasing process. Specifically, a position that arises after release of the selector finger in the selection direction and/or in the shift direction is used to initialize or align an incremental position sensor.

In accordance with a particularly preferred embodiment of the invention, an (incremental) position sensor detects the change in position of the selector finger during the releasing process.

In accordance with the invention, a shift mechanism, which has a selection-shift-passageway layout, within which a selector finger can be moved with clearance relative to the longitudinal walls of the passageways, has at least one gear coding device.

With this gear-coding device, the respectively engaged gear can be coded in such a way that its identity can be checked, independently of the position of the selector finger, which the selector finger assumes when it is checked within the selection-shift-passageway layout. It should be noted that this does not necessarily exclude the possibility that the selector finger movement can be tracked by a position sensor during the coding or decoding process. In accordance with the invention, however, it is also preferable for decoding to be possible without a position sensor detecting the selector finger movement during decoding.

In accordance with a particularly preferred embodiment of the invention, the identity of an engaged gear can be determined, wherein the selector finger remains in its gear end position and/or neutral position, especially during decoding.

The selector finger is preferably moved into its gear end position in accordance with a predetermined characteristic in order to decode the gear identity information.

In accordance with a particularly preferred embodiment of the invention, decoding the identity of the engaged gear is determined based upon predetermined geometric parameters for the shift gate of the transmission and/or the selection-shift-passageway layout.

It is particularly preferred that, when engaging a gear, the selector finger is controlled in such a way that it is positioned in predetermined position regions within the neutral position and/or the gear end position, which have clearance room in the selection direction and in the shift direction, wherein the location of those predetermined position regions within the gear end position depends upon the identity of the engaged gear, in accordance with a predetermined characteristic.

In a particularly preferred embodiment of the invention, for purposes of decoding, the selector finger is moved within the gear end position in accordance with a predetermined characteristic value, wherein the pathways of movement—i.e., especially the possible travel pathways—in the selection direction and/or in the shift direction are detected. Based upon a comparison of the pathways of movement that are determined using the predetermined characteristic value, in accordance with which the selector finger rests in a predetermined region that is dependent upon the gear when the gear is engaged, the identity of the gear can be decoded.

When determining the pathways of movement of the selector finger in the neutral position, a position sensor preferably tracks the movement of the selector finger. Based upon the measurement values detected this way, the position of the selector finger, and thus the gear identity, can be determined, especially based upon the distance to the adjacent walls.

In accordance with a particularly preferred embodiment of the invention, the gear identity can be determined independently of a position sensor that is operative during the decoding process. The selector finger is preferably positioned against the walls of the shift passageway, in accordance with a predetermined characteristic value, during the coding process. Such a position involves especially resting against a longitudinal wall. A second position involves especially resting against a second longitudinal wall that is located opposite the first longitudinal wall. A third position involves especially resting against a longitudinal wall and a transverse wall. A fourth position involves especially resting against a longitudinal wall and a transverse wall, but in a different corner. For decoding purposes, a check can be performed in accordance with a predetermined characteristic value as to whether or not a movement possibility exists in a predetermined direction. In accordance with this characteristic value, the engaged gear step can be completed.

In accordance with a particularly preferred embodiment of the invention, the shift passageways have different shift passageway widths, so that it is possible to check which gear has been engaged based on a determination of the shift passageway width.

In accordance with a particularly preferred embodiment of the invention, the neutral position of the gears is designed to be rectangular in shape, wherein the gear identity is encoded by moving the selector finger to one of the four corners of this rectangle when engaging the gear, or by moving the selector finger basically to the center between two corners along an edge of this rectangle.

It should be noted that the gear end position can also be designed to have a shape other than a rectangle; the idea of differentiating between left, right, center, up and down for the purpose of positioning the selector finger to encode the gear identity information can also be transferred to gear end position regions having different forms.

The travel distances to the respective stops, which are formed by the passageway walls, enable a decoding of the gear identity information.

The invention is beneficial in that it makes it possible, without disengaging the current gear, to determine the identity of the engaged gear and/or to determine the starting values for incremental measurements of the shift and/or selection motor, or to check the incremental position sensor for plausibility.

It is further possible to perform an alignment of the incremental passageway measurement process, which is especially offered in the case of failure of the central control unit.

In accordance with a particularly preferred embodiment of the invention, the gear coding device allows the encoded gear identity to be decoded, based upon geometric parameters of the shift gate and/or the selection-shift-passageway layout, such as the shift passageway width, etc.

In accordance with a particularly preferred embodiment of the invention, the gear identity can be determined via at least two different devices. Specifically, the gear identity process can be performed on one hand based upon the position values provided by an incremental position sensor, in accordance with a correlation with a position gear identity characteristic, and on the other hand based upon a gear-coding device in the above-described form.

The object is further attained by a shift mechanism for actuating a transmission system and which has a selection motor monitoring device. From this selection motor monitoring device the selector finger, which can be displaced in a selection-shift-passageway layout, can be controlled while engaging and/or disengaging a gear, in accordance with a predetermined characteristic value in the selection direction, such that the selector finger executes a superimposed movement in the selection direction along with a movement in the shift direction. To this end, the selector finger has clearance within the shift passageways in the selection direction, which provides the selector finger with mobility in the selection direction.

The movement of the selector finger is tracked by a position sensor, especially by an incremental distance sensor, which tracks the movement of the selector finger in the selection direction. If the movement passageway of the selector finger that is controlled by the predetermined characteristic value in the selection direction does not agree with the movement passageway detected by the position sensor, a malfunction of the selection motor and/or its position sensor can be concluded.

The invention is beneficial in that it enables a malfunction of the selection motor and/or its position sensor to be detected at a very early stage, without time-intensive measures.

It is particularly preferred that a movement in the selection direction is superimposed at a very early stage in the disengaging of the gear within the shift passageway.

In accordance with the invention, a shift mechanism is provided for actuating a transmission system having a gear plausibility monitoring device, which makes it possible to check whether a gear is engaged, and/or to determine its identity. The gear plausibility monitoring device makes those determinations basically independently of the elasticity values of shift mechanism components. The gear plausibility monitoring device also makes those determinations independently of elasticity values exhibited by the components in the transmission path between a position sensor that is arranged on the actuation device and a shift fork.

The invention is especially beneficial in that it eliminates the influence of elasticity of components, which can distort the selector finger positions determined by a position sensor. Thus, in accordance with the invention, there is no risk that an elastic extension, particularly in the above-mentioned transmission path, can be interpreted by a position sensor as a direction change of the selector finger corresponding with an expansion value, although the selector finger has not traversed that direction change.

In accordance with a particularly preferred embodiment of the invention, the gear plausibility monitoring device monitors the deviation between the target position and actual position of the selector finger—especially in the selection direction—and monitors the selection motor current.

The motor current controls a predetermined gear end position. The position indicated on the position sensor in the selection direction is compared to the target position, which the selector finger and/or the selection motor is to assume in the neutral gear position. If the current position deviates from the target position by less than a specified limit, and the selection motor and/or the selector finger has reached the target position after a predetermined period of time, i.e., it enters the switch-off hysteresis, and/or if after a predetermined time after reaching the target position it remains in the switch-off hysteresis for at least a predetermined period of time, the gear plausibility monitoring device recognizes that the gear in question has been engaged.

In accordance with a particularly preferred embodiment of the invention, the predetermined limit is set to the value of the passageway width.

In accordance with the invention, a shift mechanism has at least one gear plausibility monitoring device, which recognizes the identity of a gear as being engaged when the measured position data and/or position value of the selector finger or sliding sleeve corresponds to that of the desired and/or engaged gear, and the gear ratio that has been determined based upon the transmission input shaft r.p.m. and wheel r.p.m. corresponds with this gear. The correlation between this gear ratio and the engaged gear is preferably stored in a characteristic correlation value.

In accordance with the invention, a shift mechanism is provided for actuating a transmission system that has at least one gear recognition device, with which a vehicle clutch can be completely engaged in a controlled and deliberate manner. After ensuring that the vehicle clutch has been engaged, the engaged gear ratio is determined in the engaged condition of the clutch, based upon the engine rotational speed and the rotational speed of one wheel of the motor vehicle. This gear ratio is then compared with the gear ratio that is associated with the respective gears, in accordance with a predetermined characteristic correlation value. If an agreement of the gear ratio and/or an agreement within the scope of a specified tolerance setting has been established, the appropriate gear is recognized as being engaged.

The invention is especially beneficial in that, based upon information gained this manner with regard to an engaged gear, a position sensor, especially an incremental distance sensor, which is arranged on the selection motor and/or the shift motor, can be checked and/or aligned. The prior controlled and deliberate engagement of the clutch ensures that the gear ratio condition, which has been calculated based on the rotational speed, actually corresponds to the rotational speed condition of a gear stage. This prevents, in a controlled and deliberate manner, the calculation of a gear ratio condition that does not correspond to the engaged gear stage, due to a slippage of the clutch or the like.

In accordance with a particularly preferred embodiment of the invention, the transmission system with a shift mechanism is installed in a motor vehicle, which contains a vehicle clutch with a hydraulic clutch release system. In order to ensure the accuracy of this clutch release system and/or to decouple the necessary adjustment movements caused by outside influences, such as temperature, or the like, the clutch release system preferably contains a volume control device, which allows the volume of hydraulic fluid contained in a predetermined section of the hydraulic system to be set to a predetermined volume at predetermined intervals and/or under predetermined conditions. The gear recognition device most preferably detects the engaged gear during such a volume control process.

In accordance with a particularly preferred embodiment of the invention, the gear recognition device controls a movement in the transmission and/or a selector finger movement during the process of detecting a gear. This controlled movement causes the selector finger to move in the gear passageway in which it is currently located, to the end stop opposite to the selection passageway. In this stop position, a new initialization of the passageway measurement process by an incremental position sensor takes place.

In accordance with a particularly preferred embodiment of the invention, the gear recognition device is activated when preset conditions are detected. Specifically, the gear recognition device is activated when sensor problems are noticed.

The object is further attained by a control device for controlling a shift mechanism of a transmission system, which controls the actuation device of the shift mechanism, i.e., the selection motor and the shift motor. This control device is designed as an electrical device, which preferably supplies the selection motor and/or the shift motor with voltage and/or current in accordance with a predetermined characteristic value.

In accordance with the invention, a method for controlling a shift mechanism is provided, which in accordance with a predetermined characteristic value makes it possible to establish predetermined geometric parameters and/or predetermined geometric transmission parameters and/or predetermined parameters of the selection-shift-passageway layout based upon an unknown selector finger position.

In accordance with the invention, starting from this unknown position, the selector finger is controlled such that it will be displaced in the selection direction and/or in the shift direction for the purpose of determining the current, maximum possible movement paths. Those movement paths are evaluated based upon a predetermined characteristic value, wherein based upon the evaluation result a new selector finger position is determined and evaluated. Starting from this new position, the passageways of movement that exist in the shift direction and/or in the selection direction are determined again, before they are again evaluated, and, based upon the evaluation result, a new position is started. This process is repeated until the predetermined transmission parameters have been completely established.

In accordance with the invention, a predetermined position within the selection-shift-passageway layout will be carried out based upon a predetermined characteristic value. Preferably, the selector finger is moved in accordance with a predetermined characteristic value, starting from this predetermined position, such that predetermined transmission geometric parameters can be established.

In accordance with a particularly preferred embodiment of the invention, the neutral position and/or the synchronous positions and/or the passageway positions and/or the passageway widths can be detected via predetermined methods.

It is particularly preferred that the end points of the movements, i.e., especially the passageway walls and/or stops, are determined indirectly at least part of the time and/or at least partially.

To this end, predetermined operating parameters are monitored, and, based upon their time history, a conclusion is drawn with regard to stops, passageway walls, etc. in accordance with a predetermined characteristic value.

The method for controlling a shift mechanism for actuating a transmission system is designed such that—particularly starting from an unknown selector finger position within the selection passageway—the selector finger is controlled to shift the selector finger lengthwise along the selection passageway. The length of the shift is predetermined. The shift length is preferably predetermined such that the selector finger is moved in a predetermined direction to the end of the selection passageway. The selector finger is then shifted incrementally, especially by a single increment, in the shift direction in a predetermined direction. It is also preferred that it previously moved in the shift direction to the other end of the selection passageway with unchanged coordinates. After moving incrementally in the shift direction, the selector finger is moved over a predetermined length in the selection direction, preferably over the entire length of the selection passageway. During this process, a position sensor, which tracks movements of the selector finger in the shift direction, is monitored. If this position sensor does not indicate movement in the shift direction when the selector finger is being advanced in the selection direction, the selector finger is again moved incrementally in the shift direction, in the same direction in which it was previously moved, in increments, in the shift direction. The selector finger is then again controlled to move in the selection direction—over a predetermined length, or over the entire selection passageway length. Once again, a position sensor, which tracks the selector finger movement in the shift direction, is monitored. If this position sensor does not indicate a path change in the selection direction during the moving process, the selector finger is again displaced in the shift direction with the same direction. This process of controlling the selector finger in the selection direction while monitoring the position of the selector finger in the shift direction, followed by the subsequent incremental shifting of the selector finger, with the same movement in the shift direction, and a renewed shifting back in the selection direction while monitoring the shift position is continued until during the process of shifting in the selection direction the selector finger is deflected in the shift direction, or the selector finger is blocked in the selection direction before reaching the predetermined distance, i.e., before it has traversed the entire length of the selection passageway.

If such a deflection is detected, it can be concluded that the selector finger has come into contact with a wall, a stop, or the like, and has been stopped or deflected by it. The position that exists during this deflection process in the shift direction, and/or the position in the shift direction that existed before the last incremental movement, forms a boundary for the neutral position, which extends in the selection direction and is located on a first side of the neutral passageway center. In a corresponding way, the selection passageway wall opposite this first limit and/or wall can be sensed in order to determine a second boundary for the selection passageway. Those boundaries form the boundaries of the neutral position in the shift direction. It is also preferred that, based upon those limits, the neutral position is determined based upon a predetermined characteristic, especially by determining the average of the coordinates of the boundaries in the shift direction.

This method for determining the neutral position can also be applied in a corresponding way to the determination of the gear end positions. There the shift direction and the selection direction and/or the shift and selection passageways are reversed from the above description.

This method also allows the positions of the passageway walls and/or the surface contour of the passageway walls to be determined in sections.

In accordance with the invention, the selector finger is moved into a predetermined absolute position in the selection direction and/or the shift direction, wherein this control of the absolute position is independent of the position information as to the starting position of the selector finger and/or the selector shaft. To this end, a feature is provided for controlling predetermined movements of the selector finger, wherein at the same time a sensor's, especially a digital sensor's, field that is moved in conjunction with this selector finger movement—possibly in accordance with a predetermined transformation—is scanned. This sensor field is designed such that it is divided into different regions, and during the transition of those regions the sensor registers the transition. Dependent upon this sensor signal change and/or digital change, and/or based upon the directions in which the selector finger is moved and/or the directions in which the digital changes occur, i.e., from digital value "0" to digital value "1" or vice versa, the current position of the selector finger is deduced. The sensor field is designed such that, based upon the digital change, possibly in consideration of the direction of the digital change and/or the direction and/or orientation in which the selector finger is moved when a digital change occurs, an absolute selection and/or shift position of the selector finger can be detected. This absolute position is determined in particular by the fact that it is clearly defined in relation to the selection-shift-passageway layout. Specifically, it is a predetermined position that is attached to the base of the selection-shift-passageway layout.

In accordance with a particularly preferred embodiment of the invention, an (incremental) position sensor is set at a predetermined value for the purpose of detecting the path in the shift direction and/or in the selection direction when an absolute position in the selection direction and/or the shift direction is detected or when it is determined that the selector finger is occupying this position.

Most preferably, an absolute position for the selector finger is approached separately in the selection direction and in the shift direction.

A method in accordance with the invention provides for a neutral reference movement to be implemented and/or controlled under predetermined conditions.

The neutral reference movement has touching processes as well as pressing processes.

In accordance with a particularly preferred embodiment of the invention, a tactile process in the shift direction is performed only in connection with a pressing process in the selection direction.

In a preferred method in accordance with the invention, a neutral reference movement is initiated only when predetermined conditions are detected. Specifically, neutral reference movement is initiated when it is determined that the movability of the selector finger that is associated with a predetermined position in accordance with a predetermined characteristic value does not agree with the actual movability. In this application, movability should be understood in that starting from this position the selector finger can be moved in predetermined directions, especially in a selection direction and/or in a shift direction, a predetermined distance in a predetermined orientation, without hitting a stop device, such as a passageway wall.

In accordance with the invention, the selector finger of a shift mechanism, which is movably mounted in a selectionshift-passageway layout, is moved in the direction of a passageway wall and/or is moved against this passageway wall, where it is pushed.

It should be noted that in accordance with the invention pushing is preferably performed in a controlled manner with a predetermined amount of force.

Due to the pushing, certain components deform elastically, especially the selector finger. It should be noted that this elastically deformed state, and/or the fact that a corresponding restoring force exists, is also referred to within the framework of this application as resiliency under stress, while the corresponding unstressed rest position and/or the freedom from force of the component is described as relaxed resiliency.

The selector finger is then unloaded. This unloading process can be an unloading process that extends down to zero. It is also preferable for the force with which the selector finger is pressed against the wall is reduced, such that the forces produced by the flexibility of the selector finger or similar devices are greater than the force still being applied to the selector finger.

As a consequence, the selector finger moves back in the direction of the passageway, i.e., inward, away from the passageway wall. The (elastic) restoring forces are thus decreased, and the selector finger assumes a predetermined and/or previously known position within the passageway layout relative to the stop at which it was pushed. During this reverse movement, the change in position of the selector finger is preferably monitored. The change in position of the selector finger is preferably also monitored beforehand on a continuous basis, in which process a position sensor can be used. The final value, which this position sensor assumes when the selector finger has reached its relaxed position and/or this position, is a characteristic position. This characteristic position is stored, so that at least its coordinates in a direction perpendicular to the passageway wall are known beforehand. Furthermore, this position allows the determination of the neutral position in the selection direction and/or in the shift direction, in accordance with a predetermined characteristic value.

This derived neutral position is then compared with the stored neutral position. If deviations exist that exceed a predetermined deviation, the stored neutral position and/or the position sensor and/or its values can be adapted.

The value indicated by the position sensor is also preferably compared with the coordinates and/or with a coordinate that is perpendicular to the wall against which the selector finger is pushed, wherein, in the case of deviations that exceed a predetermined deviation, the value that is indicated by the position sensor is adapted, and/or a predetermined test routine is initiated.

In accordance with the invention, a method is provided with which a shift mechanism for actuating a transmission system can be controlled. The shift mechanism has a selection-shift-passageway layout, in which a selector finger is movable. The method of the invention allows the widths of predetermined passageways of this selection-shift-passageway layout to be determined.

In accordance with a predetermined characteristic value, the selector finger is moved and/or controlled within the passageway, such as the selection passageway or the shift passageway, in a transverse direction, i.e. toward a longitudinal wall. Upon reaching the wall, the selector finger is pushed against this wall, in accordance with a predetermined characteristic value, such that elastic deformations of the selector finger and/or the selector shaft and/or another component are caused. The selector finger is then unloaded in accordance with a predetermined characteristic value, so that the selector finger is moved toward the passageway as a result of those releasing deformations, i.e., as a result of the restoring forces, and assumes a neutral position.

It is particularly preferred that the process in which the selector finger is unloaded occurs such that the force controlling the selector finger is set to zero. Most preferably, the force applied to the selector finger is reduced in accordance with a predetermined characteristic value during the unloading process.

The approach of a passageway wall, the pushing of the selector finger, and the subsequent unloading process relative to the opposite passageway wall are preferably repeated, so that here, as well, a characteristic, unstressed neutral position is determined. Based on those characteristic positions, the passageway width is then determined.

For this purpose, the relative locations of the characteristic positions of the unstressed selector finger relative to the adjacent walls is stored as a characteristic correlation value.

In a preferred embodiment, an indirect method indicates when the selector finger impacts the outside wall. For this purpose, the shift and/or selection motor is monitored, and based on its position sensor the stop is detected.

The stopping is also preferably registered via a force measuring process. In accordance with a particularly preferred embodiment, the monitoring of the armature current of the selection motor and/or of the shift motor, or the voltage, or some other predetermined operating variable in accordance with a predetermined evaluation characteristic detects an impact of the shift lever with the passageway wall to be detected. Other methods, especially those mentioned above, are also preferred for use in detecting the impact.

In accordance with a particularly preferred embodiment of the invention, an unstressed position, i.e., a position assumed by the selector finger after pushing and the subsequent unloading process, is used to align a predetermined, stored position. Most preferably, a stored neutral position is adapted that has been determined in the above-described manner by pushing the selector finger.

It is also preferred that another operating parameter, especially a stored passageway width, is adapted accordingly.

In accordance with the invention, a method for controlling a shift mechanism of a transmission system is provided, which contains a selection-shift-passageway layout within which a selector finger can be moved. At least in its gear end position and/or its neutral position, the selector finger has play relative to the respective shift passageway walls. This play preferably exists in the shift passageway width, and most preferably also exists in the shift direction. In accordance with the invention, the identity of an engaged gear is encoded in accordance with a predetermined characteristic when this gear is engaged. The selector finger is most preferably displaced in a predetermined position region within the play range of the gear end position for the coding process. This position region is associated with the identity of the engaged gear, in accordance with a predetermined characteristic correlation value.

The gear identity information can then be decoded at a later time.

In accordance with the invention, it is not detrimental when the position information, especially of an incremental position sensor, is lost between the encoding and decoding processes. In accordance with the invention, the engaged gear is maintained during decoding, i.e., the selector finger is basically not moved out of its gear end and/or neutral position.

In accordance with a particularly preferred embodiment of the invention, the selector finger is displaced in the direction of the shift passageways and/or in the direction of the selection passageway within the gear end and/or neutral position for the purpose of decoding, wherein preferably walls or boundaries of the neutral position and/or the respective shift passageway are approached, so that the engaged gear is determined, especially using the travel length and/or the distance to a wall.

In accordance with the invention, a selector finger, which is arranged in a selection-shift-passageway layout such that it can be moved, is provided with clearance between it and the walls of the shift passageway in the selection direction, within at least one shift passageway. In order to detect a malfunction of the selection motor and/or its position sensor, the selector finger is controlled such that it is moved within a shift passageway in the selection direction in accordance with a predetermined characteristic value, under predetermined conditions and/or at predetermined times. It is particularly preferred that this movement in the selection direction—preferably regularly—occurs when a gear is being disengaged.

During movement within the shift passageways in the selection direction, i.e., in the clearance region, this movement is tracked by a position sensor.

The detected path change in the selection direction is subsequently compared with the control parameters for controlling the selector finger in the selection direction. If this comparison shows that the position sensor does not indicate path changes in the selection direction that would have had to have been indicated in accordance with the control process, it is subsequently established that the position sensor of the selection motor and/or the selection motor itself is experiencing a functional impairment. Afterwards, the value indicated by the position sensor can be adapted.

The invented method allows the identity of an engaged gear to be checked. The invented method further or alternatively makes it possible to check existing gear identity information for accuracy.

In accordance with the invention, a signal is produced, which serves to ensure that the starting clutch of a motor vehicle is in an engaged state. To this end, the invention provides a feature for accurately controlling the starting clutch such that it is in an engaged, adhered state. The identity of the engaged gear is then determined based upon the number of revolutions that exist on different sides of the starting clutch, i.e., especially the engine rotational speed and the rotational speed of one wheel. Based upon a predetermined characteristic value, which gear is engaged is determined from the existing rotational speeds and/or the rotational speed ratio.

In accordance with a particularly preferred embodiment of the invention, an invented method is initiated when predetermined conditions, such as sensor problems, contradictory position data, etc., are detected. This is the case particularly when a stop is detected, which, based on the detected position data, should not actually occur there.

In a preferred embodiment, the invented method is used in a motor vehicle with a clutch unit that can be actuated by a hydraulic release system. This hydraulic release system has a volume control device, wherein the invented method is applied at least some of the time when a volume compensation process is performed.

In a particularly preferred embodiment, this invented method is used for adapting position and/or gear identity information, which is determined based upon a position sensor that follows the selector finger movement.

In a preferred embodiment, the selector finger is moved in the shift direction to the end stop, which faces away from the selection passageway. This serves to ensure that a gear is engaged. Furthermore, the end stop can be used to reinitialize the path measurement and/or the position sensor.

In accordance with the invention, a method for controlling a shift mechanism is provided, with which the identity of an engaged gear can be determined, and/or which is suited for examining information with regard to an engaged gear.

In accordance with the invention, the selector finger is moved in the direction of a predetermined gear end position. For this a target position is specified. During the engagement of a gear stage, an actual position of the selector finger and/or the selector motor and/or the shift motor is detected. Due to the elasticity of the transmission passageway, it can appear that the actual position of the selector finger does not agree with the actual position determined by the position sensor. The deviation in the position between target value and actual value is determined, wherein the selection motor current is also monitored. The identity of the controlled gear and/or the gear identity produced and/or associated with a characteristic correlation value is recognized as being engaged when the following conditions have been met: on one hand the deviation in the position between target value and actual value is below a predetermined limit; on the other hand, the target position in the selection direction has been reached within a predetermined first period of time and/or the selection motor experiences a shut-off hysteresis upon reaching the target position for at least a predetermined period of time.

In accordance with a particularly preferred embodiment of the invention, the predetermined limit largely corresponds to the passageway width of the shift passageway that is associated with the gear to be engaged.

In known configurations, cases can arise due to component elasticity, in which the position sensor indicates a selector finger position that is located outside the shift passageway in which the selector finger is currently situated. In extreme cases the position sensor can generate a selector finger position that corresponds to a different shift passageway from the one in which the selector finger is actually located. The invention makes it possible to avoid those disadvantages.

The patent claims that have been submitted with the application are formulation suggestions, without precedence for the purpose of obtaining broader patent protection. The applicant reserves the right to claim additional features, which have so far only been revealed in the description and/or drawings.

References employed in the sub-claims point to a further expansion of the object of the main claim through the features of the respective sub-claims; they should not be understood as a waiver of obtaining independent protection of the object for the features of the sub-claims to which reference is made.

The objects of those sub-claims however also represent autonomous inventions, which exhibit a design that is independent from the objects of the previous sub-claims.

The invention is not limited to the example(s) in the description. Within the framework of the invention rather numerous alterations and modifications are possible, in particular such variations, elements, combinations, and/or materials which have inventive character, especially via the combination or modification of individual features and/or elements or procedural steps in connection with those described in the general description and embodiments, as well as in the claims and those contained in the drawings, and which lead to a new object or to new procedural steps and/or procedural step sequences through features that can be combined, and to the extent that they relate to manufacturing, testing, and processing methods.

It should be pointed out that the interaction of the individual features of the invention is preferred in any random combination. In addition, combinations of characteristic features that are revealed by the independent claims while eliminating one or more characteristic features are preferred. The invented methods are also preferred in combination.

Furthermore, it should be noted that the embodiments for all known configurations, which do not relate to certain publications, are primarily known to the applicant and/or inventor, so that the inventor reserves the right to protect them to the extent that they are not known to the public.

It should be noted that when combining features with "or," this "or" should be understood on one hand as a mathematical "or" and on the other hand as an "or" that excludes the respective other possibility.

It should further be noted that the term 'control' and terms derived from this term should be understood in a broad sense in accordance with the invention. This term comprises in particular a controlling and/or regulation, in accordance with the DIN (German Industrial Standard).

For the expert it is obvious that, beyond the embodiments of the invention that are presented here, a multitude of additional modifications and embodiments are feasible, which are covered by the invention. The invention is not limited to the embodiments shown here.

BRIEF DESCRIPTION OF THE DRAWINGS

The invention will now be described in greater detail based on examples of embodiments, which do not limit the invention.

They show.

DESCRIPTION OF THE PREFERRED EMBODIMENTS

Figure 1:
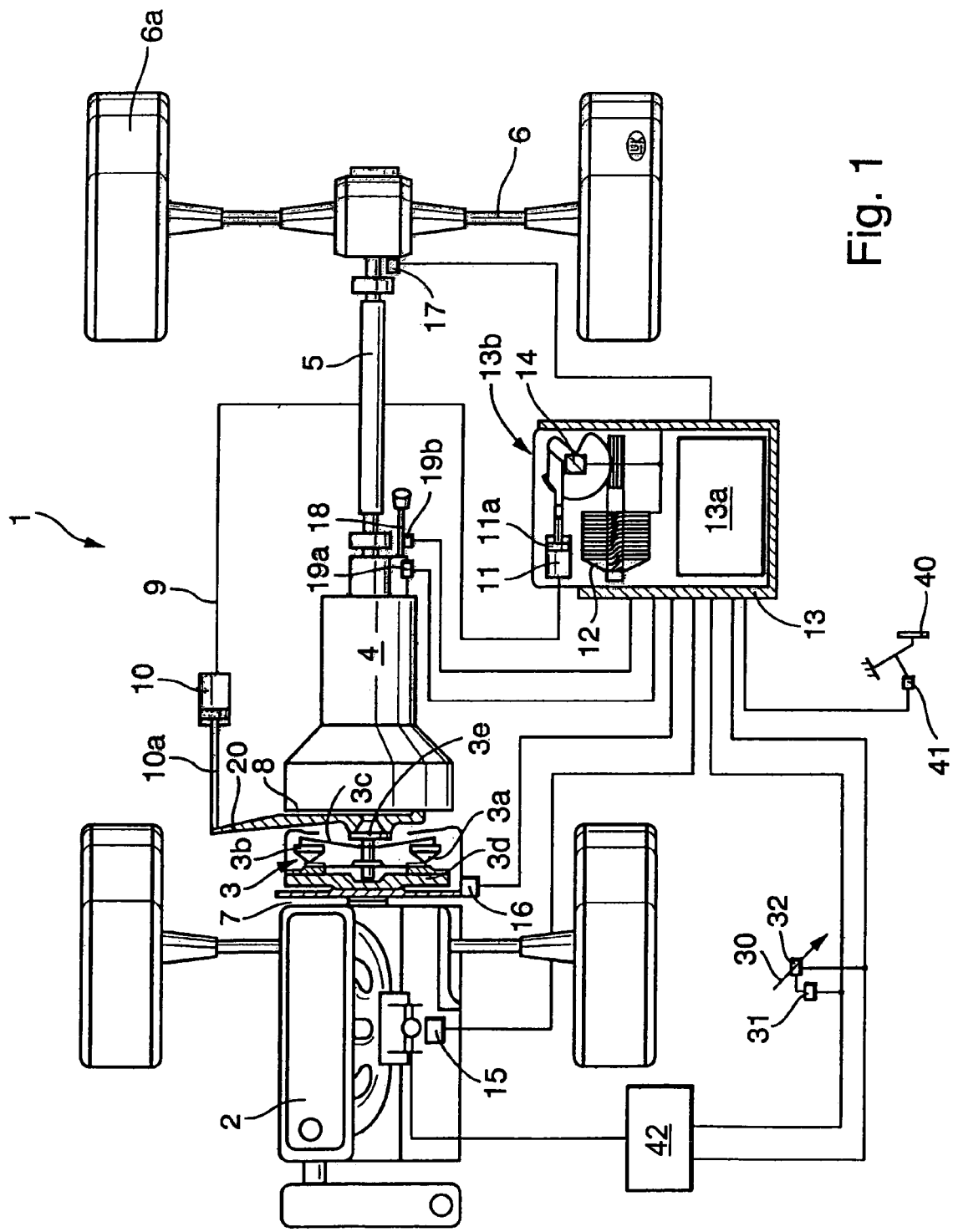
FIG. 1 a first exemplary embodiment of the invention in a diagrammatic partial view.

FIG. 1 shows a diagrammatic view of a vehicle 1 with a drive unit 2, such as a motor or internal combustion engine. Further, a torque transmitting system 3 and a transmission 4 are shown in the drive train of the vehicle. In this exemplary embodiment, the torque transmitting system 3 is positioned in the flow of power between the motor and the transmission, wherein the driving torque of the motor is transmitted via the torque transmitting system to the transmission, and from the output side of transmission 4 to an output drive shaft 5 and a subsequent axle 6 and the wheels 6a.

A motor vehicle in accordance with FIG. 1 preferably contains a transmission system and/or control device in accordance with the invention.

It is also preferred that in a motor vehicle 1 a method in accordance with the invention can be implemented.

The torque transmitting system 3 is designed as a clutch, such as a friction clutch, a multi-disk clutch, a magnetic powder clutch, or a converter-bridging clutch, wherein the clutch can be a self-aligning or a wear-compensating clutch. The transmission 4 is depicted as a manual transmission, such as speed-changing transmission. In a preferred embodiment the transmission is designed as an automated shift transmission, which can be automatically shifted via at least one actuation device. An automated shift transmission should furthermore be understood as an automated shift transmission that is shifted with a tractive force interruption, and in which the shifting process for the gear ratio is implemented by means of at least one actuation device, in a controlled manner.

Furthermore, an automatic transmission can also be used, in which an automatic transmission refers basically to a transmission without tractive force interruption in the shifting processes, which as a rule is constructed with planetary gear stages.

A continuously variable transmission, such as a belt-driven, conical pulley transmission, can also be used. The automatic transmission can be equipped with a torque transmitting system 3, such as a clutch or a friction clutch, which is positioned on the output side. The torque transmitting system can also be designed as a starting clutch and/or a change gear clutch for reversing the direction of rotation, and/or as a safety clutch with a torque that can be transmitted and controlled in an accurate manner. The torque transmitting system can be a dry friction clutch or a wet running friction clutch, which partially runs in a fluid. It can also be a torque converter.

The torque transmitting system 3 has an input side 7 and an output side 8, wherein torque is transmitted from the input side 7 to the output side 8 by force that is supplied to the clutch disk 3a through the pressure plate 3b, the disk spring 3c, and the release bearing 3e, and through the flywheel 3d. For the purpose of supplying this force, the release lever 20 is operated by an actuation device, such as an actuator.

The torque transmitting system 3 is controlled via a control unit 13, such as a control device, which can comprise the control electronics 13a and the actuator 13b. In another beneficial embodiment, the actuator and the control electronics can also be arranged in two different components, such as housings.

The control unit 13 can contain the control and power electronics for controlling the electric motor 12 of the actuator 13b. This can be advantageously accomplished due to the fact that the only space the system requires is the space for the actuator with the electronics. The actuator consists of a driving motor 12, such as an electric motor, wherein the electric motor 12 operates a master cylinder 11 via a transmission, such as a worm gear drive, a spur gear drive, a crank mechanism, or a threaded spindle gear drive. This operation on the master cylinder can occur directly or through rods.

The movement of the starting part of the actuator, such as the master cylinder piston 11a, is detected via a clutch path sensor 14, which detects the position or attitude or speed or acceleration of a value that is proportional to the position and/or engagement position, or the speed or acceleration of the clutch. The master cylinder 11 is connected to the slave cylinder 10 via a pressure communicator 9, such as a hydraulic conduit. The output element 10a of the slave cylinder is actively connected to the release lever or release means 20 so that a movement of the output element 10a of the slave cylinder 10 causes the release means 20 to be moved or tilted to control the torque transmitted by the clutch 3.

To control the transmittable torque of the torque transmitting system 3, the actuator 13b can be actuated via a pressure means, i.e., it can be equipped with pressure-operated master and slave cylinders. The pressure means can especially be a hydraulic fluid or a pneumatic medium. The actuation of the pressure-operated master cylinder can be provided by an electric motor, wherein the electric motor 12 can be controlled electronically. The driving element of the actuator 13b can also be another preferably pressure-operated driving element, in addition to the electric motor driving element. Furthermore, magnetic actuators can be used in order to adjust the position of an element.

In the case of a friction clutch, transmittable torque is controlled by pressing the friction linings of the clutch disk between the flywheel 3d and the pressure plate 3b, in a precise manner. The position of the release mechanism 20, such as a release fork or central release device, allows the force that is supplied to the pressure plate and friction lining to be accurately controlled; the pressure plate can then be moved between two final positions, and can be randomly adjusted and fixed. One end position corresponds to a completely engaged clutch position and the other end position to a completely disengaged clutch position. To control transmittable torque, which is lower than the engine torque that is available at any given time, a position of the pressure plate 3b, which lies in an intermediate region between the two end positions, can be controlled. The clutch can be fixed in this position by the accurate control of the release mechanism 20. However, transmittable clutch torque that is higher than the engine torque that is available at any given time can also be controlled. In such a case, the actual engine torque can be transmitted, wherein the torque irregularities in the drive train, especially in the form of torque peaks, are damped and/or isolated.

For controlling or regulating the torque transmitting system, sensors are also employed, which monitor the relevant values of the entire system at least part of the time and supply necessary signals and measured values for controlling necessary condition values, and are processed by the control unit, whereby a signal connection can be provided to other electronic units, such as especially to engine electronics or an electronic system of an anti-lock braking system (ABS) or an anti-slip control (ASR) system. The sensors detect especially rotational speeds, such as wheel rotational speed and engine rotational speed, the position of the load lever, the throttle valve position, the gear position of the transmission, an intended shift, and other vehicle-specific parameters.

FIG. 1 shows that a throttle valve sensor 15, an engine rotational speed sensor 16, as well as a speedometer 17 are utilized, and measured values and/or information are forwarded to the control device. The electronic unit, such as a computer unit, in the control unit 13a processes the system input values and passes control signals on to the actuator 13b.

The transmission is designed as a speed-changing transmission, wherein the transmission ratio steps are changed via a shift lever, or the transmission is actuated or operated via this shift lever. Furthermore, at least one sensor 19b, which detects the shift intention and/or the gear position and forwards this information to the control unit, is positioned on the operating lever, such as the shift lever 18, of the manual transmission. The sensor 19a is connected to the transmission and detects the current gear position and/or a shift intention. The shift intention can be recognized by utilizing at least one of the two sensors 19a, 19b, in that the sensor is a force sensor, which detects the force that is applied to the shift lever. Furthermore, the sensor can also be arranged as a path or position sensor, wherein the control unit recognizes a shift intention from the timewise change of the position signal.

The control device is in signal connection with all sensors at least part of the time, and evaluates the sensor signals and system input values in such a way that, as a function of the current operating point, the control unit issues controlling or regulating instructions to the at least one actuator. The driving element 12 of the actuator, such as an electric motor, receives from the control unit, which controls clutch actuation, a manipulated variable that is a function of measured values and/or system input values and/or signals from the connected sensor system. To this end, a control program is implemented in the control device as hardware and/or software, which evaluates the incoming signals and calculates or determines the starting values based on comparisons and/or functions and/or performance characteristics.

The control device 13 beneficially contains a torque-determining unit, a gear position determining unit, a slippage detection unit, and/or an operating state-determining unit, or it is in signal connection with at least one of those units. Those units can be implemented as hardware and/or software via control programs, so that by means of the incoming sensor signals the torque of the drive unit 2 of the vehicle 1, the gear position of the transmission 4, as well as the slippage that exists in the region of the torque transmitting system, and the current operating state of the vehicle can be determined. The gear position determining unit establishes the currently engaged gear based on signals from the sensors 19a and 19b. Thereby the sensors that are connected to the shift lever and/or the internal transmission positioning means, such as a central selector shaft or a selector rod, serve to detect especially the position and/or the speed of those components. Furthermore, a load lever sensor 31 can be arranged on the load lever 30, such as a gas pedal, which detects the position of the load lever. Another sensor 32 can act as an idle switch 32, which is switched on via an actuated gas pedal, such as a load lever, and is switched off via a not-operated signal, so that from this digital information a determination can be made as to whether the load lever, such as the gas pedal, is actuated. The load lever sensor 31 detects the degree of actuation of the load lever.

FIG. 1 shows near the gas pedal 30, as the load lever, and the sensors that are connected to it, a brake operation element 40 for actuating the service brake or parking brake, such as a brake pedal, a hand brake lever or a hand- or foot-operated element of the parking brake. At least one sensor 41 is arranged on the operating element 40 and monitors its operation. The sensor 41 is designed in particular as a digital sensor, such as a switch, which detects whether or not the operating element is operated. This sensor can have a signal connection with a signal device, such as a brake light, which indicates that the brake is actuated. This can result for both the service brake and the parking brake. The sensor, however, can also be designed as an analog sensor, whereby such a sensor, especially a potentiometer, determines the degree of actuation of the operating element. This sensor can also be in signal connection with a signal device.

Figure 2:
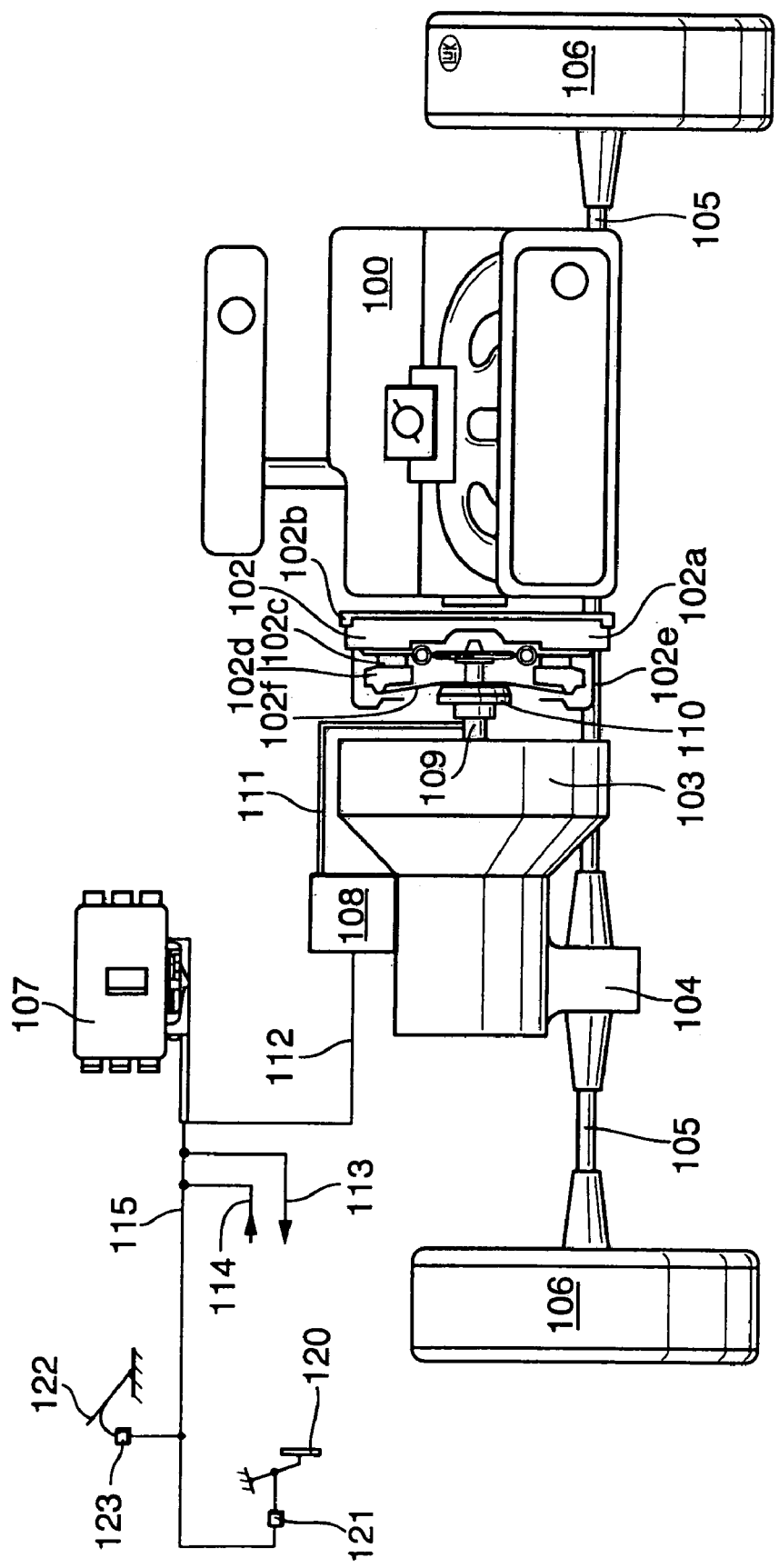
FIG. 2 a second exemplary embodiment of the invention in a diagrammatic partial view.

FIG. 2 depicts a diagrammatic view of a drive train of a motor vehicle with a drive unit 100, a torque transmitting system 102, a transmission 103, a differential 104 as well as drive axles 105 and wheels 106. The torque transmitting system 102 is arranged on or fastened to a flywheel 102a, wherein the flywheel generally contains a starting gear rim 102b. The torque transmitting system has a pressure plate 102d, a clutch cover 102e, a disk spring 102f, and a clutch disk 102c with a friction lining. The clutch disk 102c, which can if necessary be arranged with a damping device, is between the clutch disk 102c and the flywheel 102a. An energy accumulator, such as disk spring 102f, acts on the pressure plate in an axial direction toward the clutch disk, wherein a clutch actuation element 109, especially a pressure-actuated central actuating element, is provided for operating the torque transmitting system. A release bearing 110 is arranged between the central release device and the disk spring tongues of the disk spring 102f. Axial movement of the release bearing acts on the disk spring and releases the clutch. The clutch can also be designed as a pressed or pulled clutch.

The actuator 108 is an actuator of an automated shift transmission, which also contains the actuation device for the torque transmitting system. The actuator 108 actuates transmission-internal shift elements, such as a selector drum or selector rods or a central selector shaft of the transmission, wherein upon actuation the gears can be engaged or disengaged sequentially or in any random order. The clutch actuation element 109 is actuated via the connection 111. The control unit 107 is connected to the actuator via signal connection 112, with the signal connections 113 through 115 connected to the control unit, whereby the line 114 carries incoming signals, the line 113 carries control signals from the control unit, and the connection 115 establishes a connection with other electronic units via a data bus.

Referring again to FIG. 1, to drive off or to start the vehicle basically from a standing position or a slow rolling motion, such as a creeping motion, i.e., for a controlled acceleration of the vehicle that is initiated by the driver, the driver actuates only the gas pedal, such as the load lever 30, wherein the controlled or regulated automated clutch operation controls the torque to be transmitted by the torque transmitting system by means of the actuator during a starting process. By actuating the load lever, the load lever sensor 31 detects the driver's desire for a more or less strong or fast starting process, and controls the control unit accordingly. The gas pedal and its sensor signals are used as input values for controlling the starting process of the vehicle.

In a starting process, the torque to be transmitted, such as the clutch torque $T_{CTarget}$, is basically determined via a specifiable function, or based upon characteristic lines or characteristic fields, especially as a function of the engine rotational speed, wherein the dependence on the engine rotational speed or on other values, such as engine torque, is beneficially realized through a characteristic field or a characteristic line.

If during the process of starting from a standing position or from a slow creeping condition, the load lever and/or the gas pedal is actuated at low speed to a predetermined value a, then the engine torque is controlled via an engine control unit 42. The control unit of the automated clutch actuator 13b controls the torque transmitted by the torque transmitting system to correspond with predetermined functions or characteristic fields, so that a stationary equilibrium condition is set between the controlled engine torque and the clutch torque. The equilibrium condition is characterized based upon the load lever position a by a predetermined starting rotational speed, a starting or engine torque, as well as a defined transmittable torque of the torque transmitting system, and a torque that is transmitted to the driving wheels, such as a driving torque. The functional connection of the driving torque as a function of the starting rotational speed is referred to below as the starting characteristic line. The load lever position a is proportional to the position of the throttle valve of the engine.

Near the gas pedal 122, such as a load lever, and a sensor 123 that is connected to it, FIG. 2 also shows a brake actuation element 120 for actuating the service brake or the parking brake, such as a brake pedal, a manual brake lever, or a hand- or foot-actuated element for applying the parking brake. At least one sensor 121 is connected to the actuation element 120 and monitors its actuation. The sensor 121 is designed specifically as a digital sensor, such as a switch, which detects whether or not the actuation element is actuated. A signal device, such as a brake light, can be in signal connection with this sensor, to signal that the brake has been actuated. This can apply to both the service brake and the parking brake. The sensor, however, can also be designed as an analog sensor, wherein such a sensor, especially a potentiometer, determines the degree of actuation of the actuation element. This sensor can also be in signal connection with a signaling device.

Figure 3:
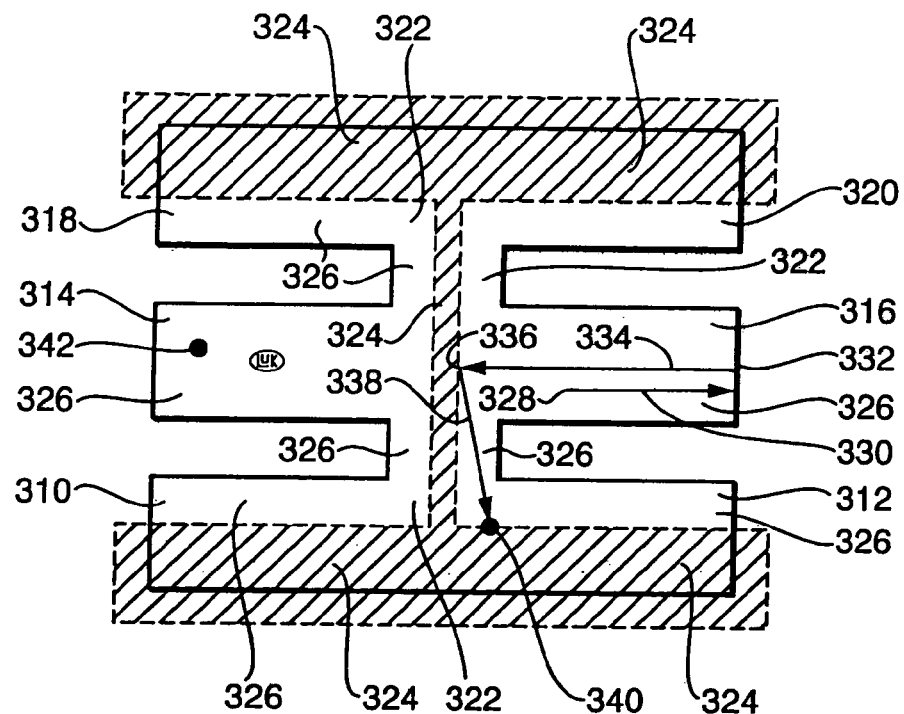
FIG. 3 a third exemplary embodiment of the invention in a diagrammatic partial view.

FIG. 3 shows a selection-shift-passageway layout that is contained in a shift mechanism of a transmission system and has shift passageways 310, 312, 314, 316, 318, 320, as well as a selection passageway 322. FIG. 3 further shows a pattern that is projected onto this selection-shift-passageway layout, which pattern contains a first region 324 and a second region 326. The first region 324 is thereby associated with a first digital signal of the sensor field, while the second region 326 is associated with a second digital signal of the sensor field.

A selector finger, not shown, that is moved especially from position 328 toward the passageway wall 332, in the direction indicated by the arrow 330, is controlled in such a way that it strikes this passageway wall, which is detected in accordance with a predetermined characteristic line, especially by monitoring a parameter or its course over time, such as especially motor voltage or motor current. After contact with the passageway wall 332 has been detected, the selector finger is moved back in the direction of the arrow 334 toward the selection passageway 322. At the position 336 the selector finger, which to that point was moved in second region 326, encounters first region 324 of the pattern. The digital change associated with this makes it possible to detect and/or establish an absolute position in the shift direction. This absolute position can be used in aligning, for example, an incremental position sensor. The selector finger is then moved in the direction of the arrow 338, whereby at the position and/or the selector finger position 340 a boundary between the second region 326 and the first region 324 is encountered, and is registered as a digital change by the sensor device, not shown, and which reads the sensor field. This digital change enables the detection of an absolute position in the selection direction.

In the example of a selector finger control process, within three movement processes both an absolute position in the shift direction and an absolute position in the selection direction are detected, both of which can be used in aligning a position sensor.

It should be noted that the position of the selector finger in the position 328 can be unknown in accordance with the invention. If the selector finger had been in another unknown position, such as the selector finger position 342, then the absolute position in the shift direction and in the selection direction would have been detected following two movement processes. It should be noted that in such a case movement in the direction of the arrow 338 would have been symmetrical to the axis of the selection passageway.

Figure 4:
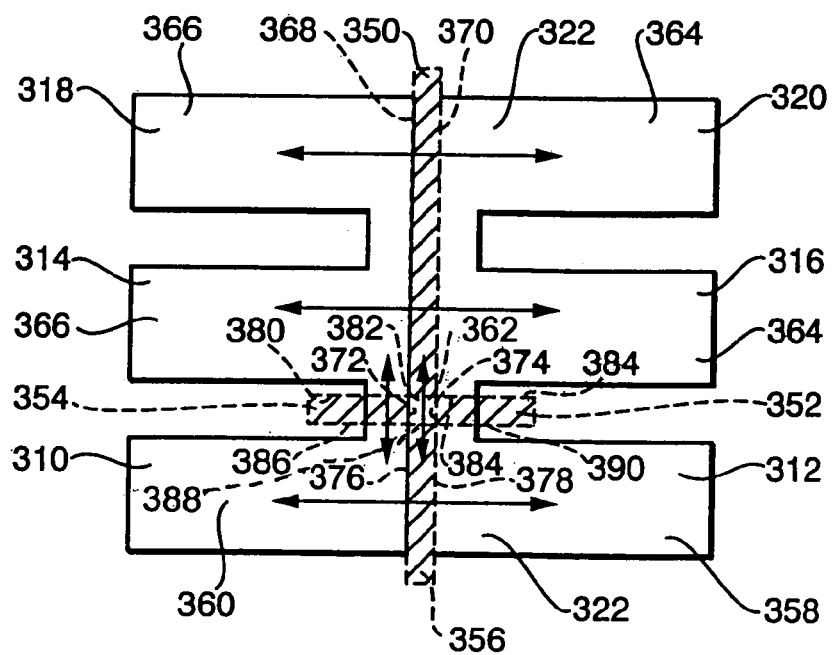
FIG. 4 a fourth exemplary embodiment of the invention in a diagrammatic partial view.

FIG. 4 shows a fourth exemplary representation of the invention in a diagrammatic, partial view.

Specifically, a selection-shift-passageway layout with shift passageways 310, 312, 314, 316, 318, 320 and with a selection passageway 322 is also shown in FIG. 4.

Within this selection-shift-passageway layout, a pattern that has been projected in accordance with a sensor field is shown, which has first regions 350, 352, 354, 356 and second regions 358, 360, 362, 364, 366.

The first regions 350, 352, 354, 356 are associated with a first digital signal, while the second regions of the pattern, 358, 360, 362, 364, 366 are associated with a second digital signal. When moving from the second region 366 into the first region 350 or vice versa, a digital change, which can be used to align the shift passageway position, can be detected at the contact line 368. In a corresponding way, an absolute position in the shift direction can also be detected at the contact line 370 between the first region 350 and the second region 364 and/or at the contact line 372 between the first region 354 and the second region 362 and/or at the contact line 374 between the second region 362 and the first region 352 and/or at the contact line 376 between the second region 360 and the first region 356 and/or at the contact line 378 between the first region 356 and the second region 358. It should be noted that such travel movements in both directions of shifting could be considered as travel movements. The travel direction and orientation are taken into consideration when determining the absolute position.

In the selection position, an absolute position can be detected especially at the contact lines 380, 382, 384, 386, 388, 390, i.e., at the transitions between the second region 366 and the first region 354 and/or the first region 350 and the second region 362 and/or between the second region 364 and the first region 352 and/or the transition between the first region 354 and the second region 360 and/or the transition between the second region 362 and the first region 356 and/or the transition between the first region 352 and the second region 358.

Here, as well, directions of travel, especially in the direction of the selection passageway 322, are possible. It is also preferred that traversing movements in the selection direction are preferably executed at a small angle relative to the selection direction.

Figure 5:
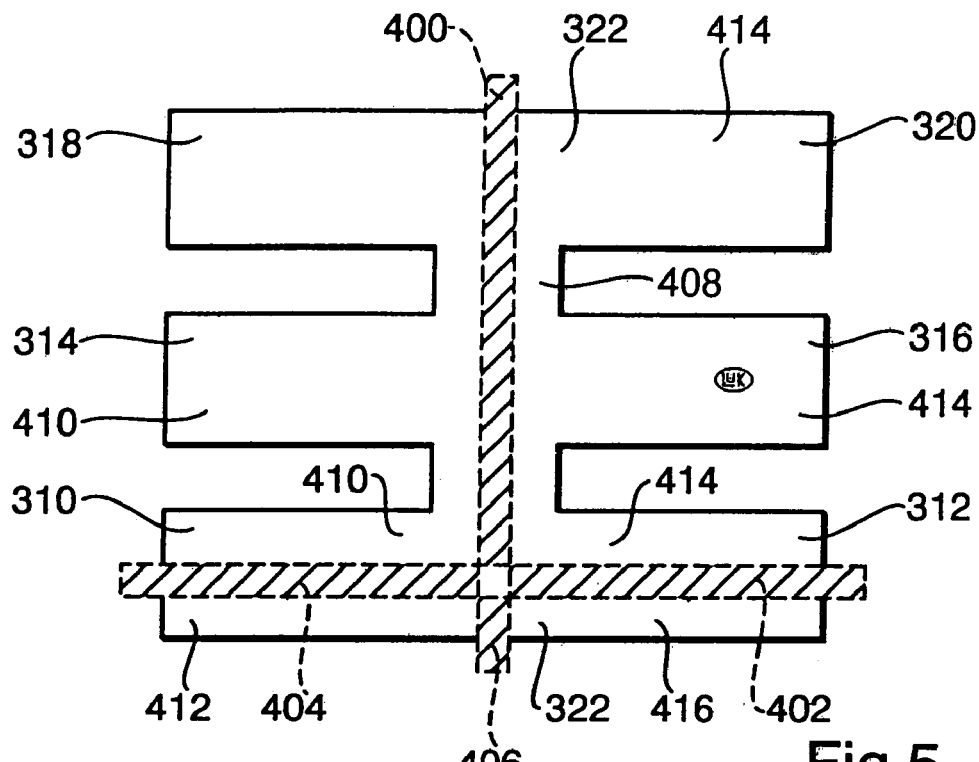
FIG. 5 a fifth exemplary embodiment of the invention in a diagrammatic partial view.

FIG. 5 shows a fifth exemplary embodiment of the invention in a diagrammatic, partial view.

FIG. 5 shows a selection-shift-passageway layout with a projected digital pattern. The first region 400, 402, 404, 406 is basically designed in a cross shape, while the overlap region of the crossing branches is designed as a second region 408. The first region 402 and/or 404 extends into the shift passageway 310 and/or 312 so that it interrupts the first region 410, 412 and/or the first region 414, 416 and/or borders it.

Figure 6:
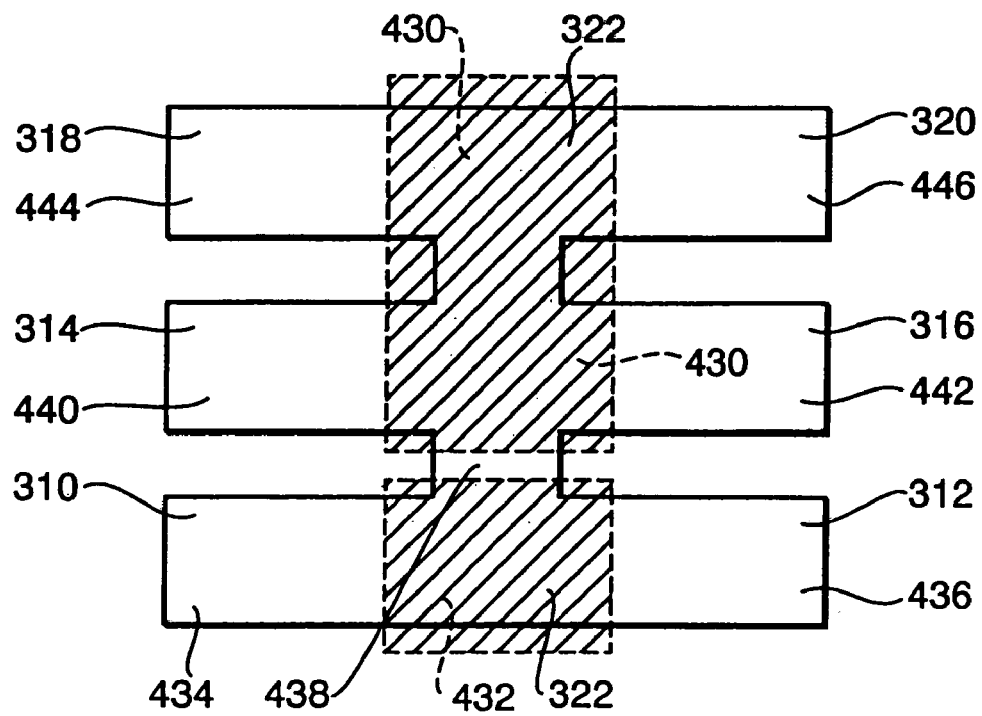
FIG. 6 a sixth exemplary embodiment of the invention in a diagrammatic partial view.

FIG. 6 shows a sixth exemplary embodiment of the invention in a diagrammatic, partial view.

Specifically, FIG. 6 depicts another exemplary embodiment of a pattern that is projected onto a selection-shift-passageway layout.

This pattern, which corresponds to the transformation of a digital signal field, contains a first region 430, 432, which is associated with a first digital signal, as well as a second region 434, 436, 438, 440, 442, 444, 446, which is associated with a second digital signal that differs from the first digital signal.

The first region 430, 432 extends basically in a longitudinal direction of the selection passageway 322, and is interrupted by a second region 438 in a position which here is situated in the selection direction between two shift passageways.

The first region extends across the entire width of the selection passageway 322 in the selection direction and in addition into the shift passageways 310, 312, 314, 316, 318, 320.

When crossing over from the first region 430 into the second region 438 or vice versa, and/or when crossing over from the first region 432 into the second region 438 or vice versa, an absolute position in the selection direction can be determined based on the digital change that occurs.

Correspondingly, when crossing over from the second region 440 and/or 422 and/or 444 and/or 446 into the first region 430 or vice versa, an absolute position in the shift direction can also be determined, as for a crossover from the second region 434 and/or 436 into the first region 432 or vice versa.

Figure 7:
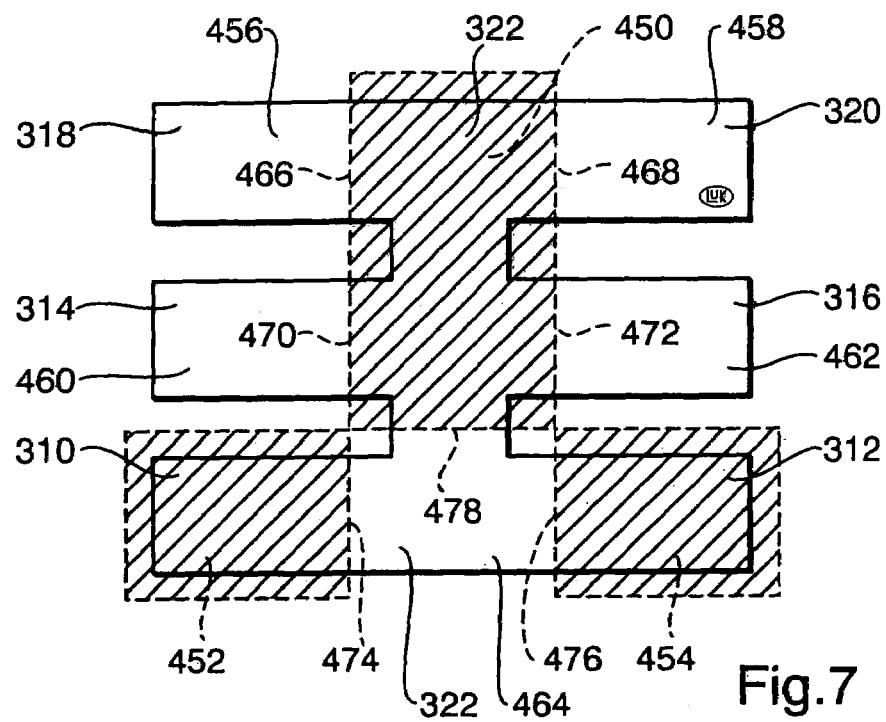
FIG. 7 a seventh exemplary embodiment of the invention in a diagrammatic partial view.

FIG. 7 shows a seventh exemplary embodiment of the invention in a diagrammatic, partial view.

Specifically, FIG. 7 shows an exemplary pattern that is projected onto a selection-shift-passageway layout, which corresponds to a digital signal field.

The digital signal field is located on the selector shaft, which is not shown.

The first region and/or its sections 450, 452, 454 represent a first digital signal, which causes a sensor device to start when the signal field is scanned and/or when the finger, not shown, is located in this region.

Correspondingly, the partial sections of the second region 456, 458, 460, 462, 464 produce a second digital signal, which differs from the first, when the sensor device, not shown, scans the signal field in regions that correspond to those sections and/or when the selector finger is located in those sections.

The first region 450, 452, 454 consists of a section 450, which is aligned in the selection direction, and a section 452, 454, which is aligned in the shift direction, wherein the overlap region of those sections 450, 452, 454 represents a second region 464.

Aside from that, in the region of overlap, the sections 450, 452, 454 of the first region form a second region 464, and the first region is T-shaped in this exemplary embodiment of the pattern.

When the selector finger, not shown, reaches the contact lines 466, 468, 470, 472, 474, 476 and/or crosses over them, and/or when the sensor device, not shown, detects a digital change when scanning the sensor field, an absolute position in the shift direction can be determined, especially if the travel direction of the selector finger and/or its orientation are taken into consideration.

In a corresponding way, when moving in the selection direction, an absolute position in the selection direction can be determined at the contact line 478 and/or the associated digital change.

Figure 8:
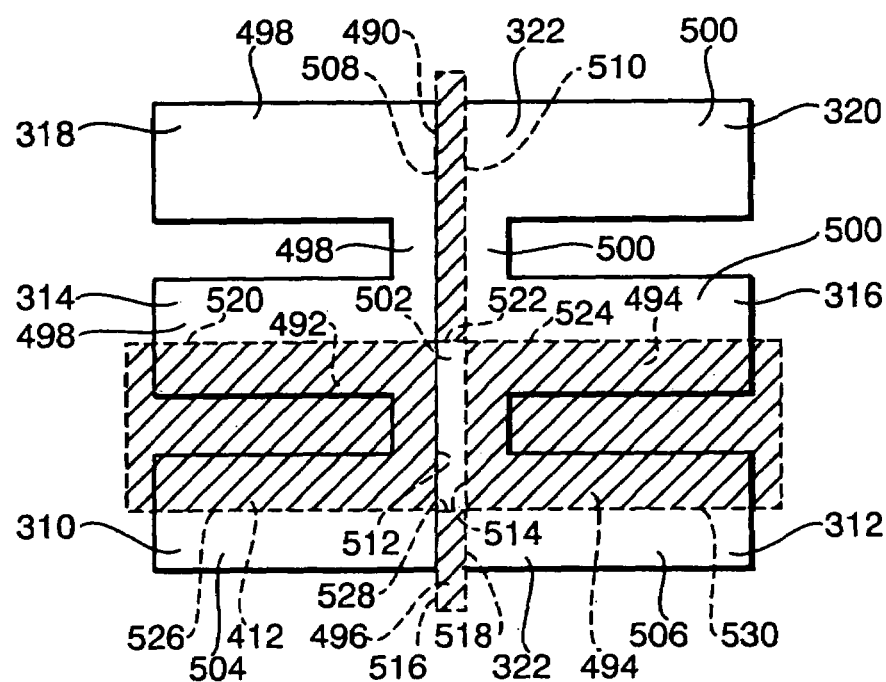
FIG. 8 an eighth exemplary embodiment of the invention in a diagrammatic partial view.

FIG. 8 depicts a selection-shift-passageway layout, into which a pattern that corresponds to a digital sensor field is projected.

This pattern contains a first region 490, 492, 494, 496, which is basically cross-shaped and is oriented in the selection direction as well as in the shift direction, with which a first digital signal.

Correspondingly, the pattern has a second region 498, 500, 502, 504, 506, with which a second digital signal is associated.

The overlap region of the cross-shaped first region 490, 492, 494, 496 is formed as a second region 502.

The sections 492, 494 of the first region that extend in the shift direction are arranged in such a way that they extend into two adjacent shift passageways 310, 314 and/or 312, 316, respectively. In doing so, however, they cover only a section of those passageways 310, 312, 314, 316, while another section is covered by a second region 498, 500, 504, 506.

A digital change is detected at the contact lines 508, 510, 512, 514, 516, 518 during a travel movement, which has at least one component in the shift direction. Upon detecting this digital change, an absolute position of the selector finger in the shift direction can be established, especially when the direction and orientation of the travel movement are taken into consideration.

In a corresponding way, an absolute position in the selection direction can be detected at the contact lines 520, 522, 524, 526, 528, 530.

Figure 9:
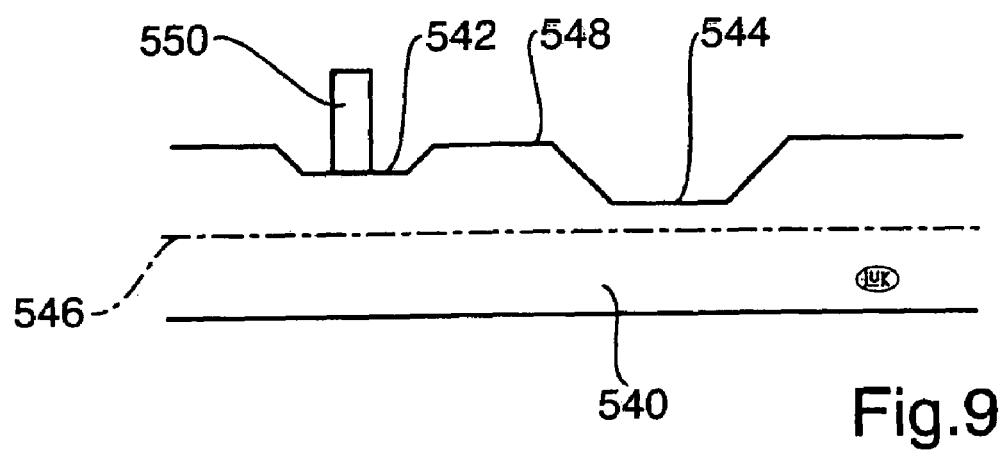
FIG. 9 a ninth exemplary embodiment of the invention in a diagrammatic partial view.

FIG. 9 depicts a selector shaft 540 in a partial view with a first recess 542 and a second recess 544. The depth of the first recess 542 is less than the depth of the second recess 544, so that those recesses 542, 544 have a different potential relative to the central axis 546 of the selector shaft 540. In the axial direction of the selector shaft 540 region 548 is located between the recesses 542 and 544, which region has a third potential relative to the central axis 546 and otherwise corresponds to the "normal" outer circumference of the selector shaft 540.

When the selector shaft 540 is moved in an axial direction to actuate a transmission system, not shown, the stationary sensor device 550 feels the outer surface of the selector shaft 540 and rests in predetermined shifting positions in the region 548 and/or in the recess 542 and/or in the recess 544. Depending upon the associated penetration depth, the transmission positions that exist when the sensor device 550 is arranged in the recess 542 and/or the recess 544 can be differentiated from other transmission positions.

The first recess 542 corresponds to the "neutral" transmission position, while the transmission position in which the sensor device 550 rests in the second recess 544 corresponds to the "reverse" transmission position.

Figure 10:
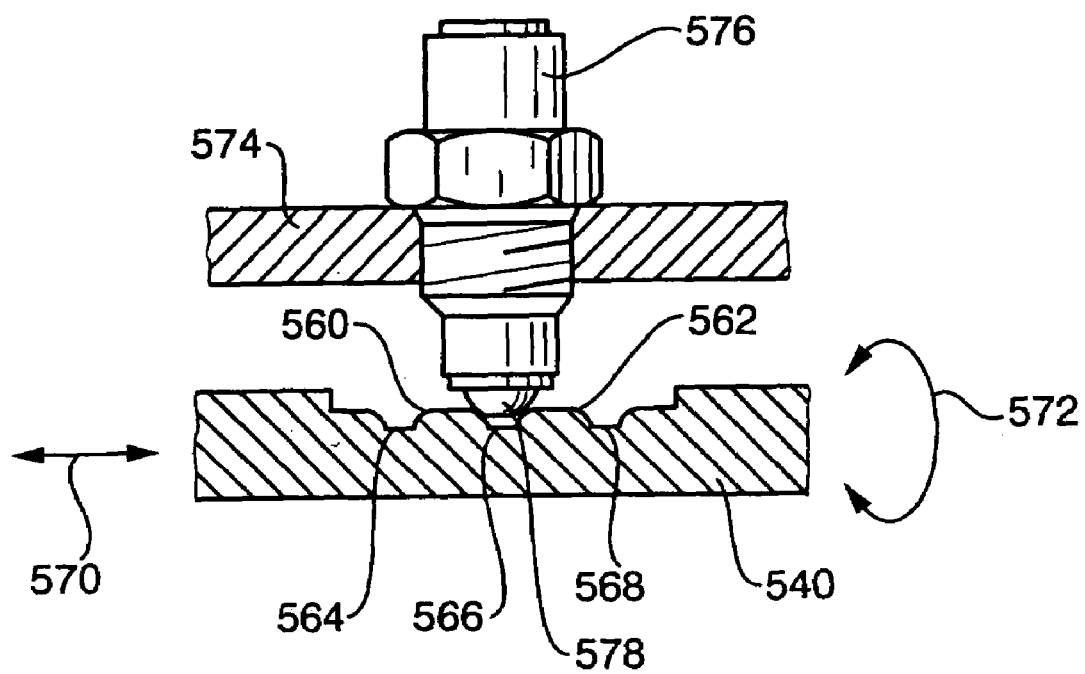
FIG. 10 a tenth exemplary embodiment of the invention in a diagrammatic partial view.

FIG. 10 depicts a selector shaft 540 that has a profile. The profile of the selector shaft 540 has surface elevations 560, 562 as well as surface recesses 564, 566, 568.

To actuate the transmission system, not shown, the selector shaft can be moved axially in the direction of the double arrow 570, as well as rotatably, or rotatably swiveable, in the direction of the double arrow 572 around the central axis of the selector shaft.

The retainer 576 that is supported in the transmission housing 574 has a spring-loaded ball 578, which rests against the surface profile of the selector shaft 540. When the selector shaft 540 is moved, the ball 578 consequently moves along the surface profile of the selector shaft 540. The profile causes the ball to execute a partial translatory movement in the direction of the retainer axis.

In transmission positions in which the ball 578 rests in the surface recesses 564, 566, 568 of the selector shaft, the transmission system is in predetermined shifting positions, and/or a selector finger, not shown, is in predetermined positions within a selection-shift-passageway layout.

Specifically, three surface recesses 564 are arranged on the outer circumference of the selector shaft at the same axial location, wherein the transmission system is in the end positions of the first and/or the third and/or the fifth gears when the ball 578 rests in the surface recesses 564.

In a corresponding way, the transmission is in the neutral position when the ball 578 is located in the surface recess 566.

The transmission system accordingly assumes the end positions of the second, the fourth, and/or the reverse gears when the ball 578 is located in one of the three surface recesses 568 of the selector shaft that are arranged on the circumference at the same axial position.

The shift rest device (retainer) shown in FIG. 10 preferably produces redundancy signals for the measured values and/or signals regarding the gear end position that have been produced by a position-sensing device.

In the retainer a sensor, not shown, is positioned, which detects the different translatory positions of the ball 578 and/or which determines when the ball 578 lies in the surface recesses 564, 566, 568.

Figure 11:
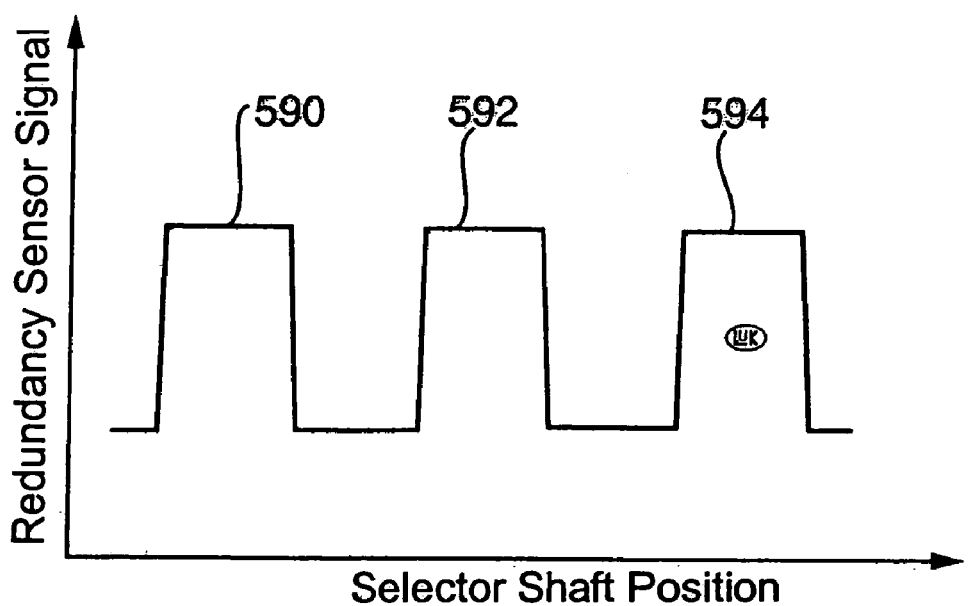
FIG. 11 an eleventh exemplary embodiment of the invention in a diagrammatic partial view.

FIG. 11 shows an example of a course of a signal which can be produced by the retainer shown in FIG. 10 and/or by its sensor device.

Specifically, it shows the course of a signal of the redundancy sensor shown in FIG. 10 over the selector shaft position.

The signal 590 indicates that the transmission system is in the gear end position of the first or the third or the fifth gear.

The signal 592 indicates that the transmission system is in a neutral position.

The signal 594 indicates that the transmission is in the gear end position of the second, the fourth, or the reverse gears.

Figure 12:
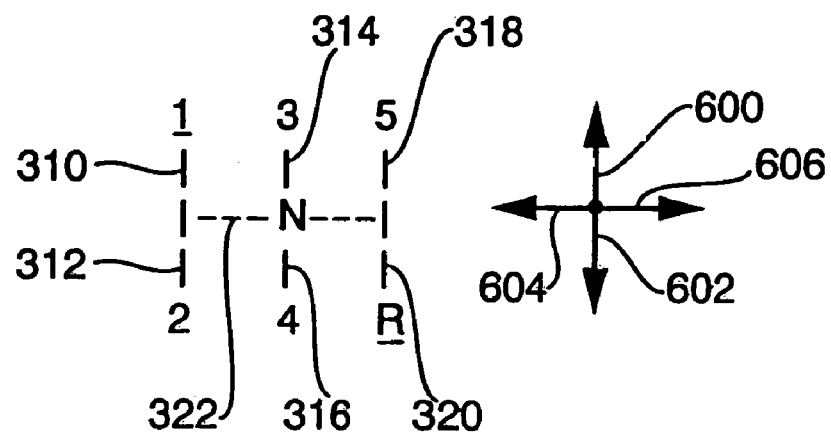
FIG. 12 a twelfth exemplary embodiment of the invention in a diagrammatic partial view.

FIG. 12 shows a selection-shift-passageway layout, which is used in accordance with the invention.

For purposes of clarity the following directional agreement is made. The arrow 600 lying in the shift direction points forward, while the arrow 602 oriented the opposite direction points backward. The arrow 604, oriented in the selection direction, points to the left, while the arrow 606, oriented opposite the arrow 604, points to the right.

At the front, the first, the third, and the fifth gears are arranged next to one another from left to right. At the back, the second, the fourth, and the reverse gears are arranged next to one another from left to right. The neutral position is basically in the middle.

It should be noted that the reverse gear is also preferably arranged not—as shown here—diametrically opposite and outward of the first gear, but to the left near the first gear.

Figure 13:
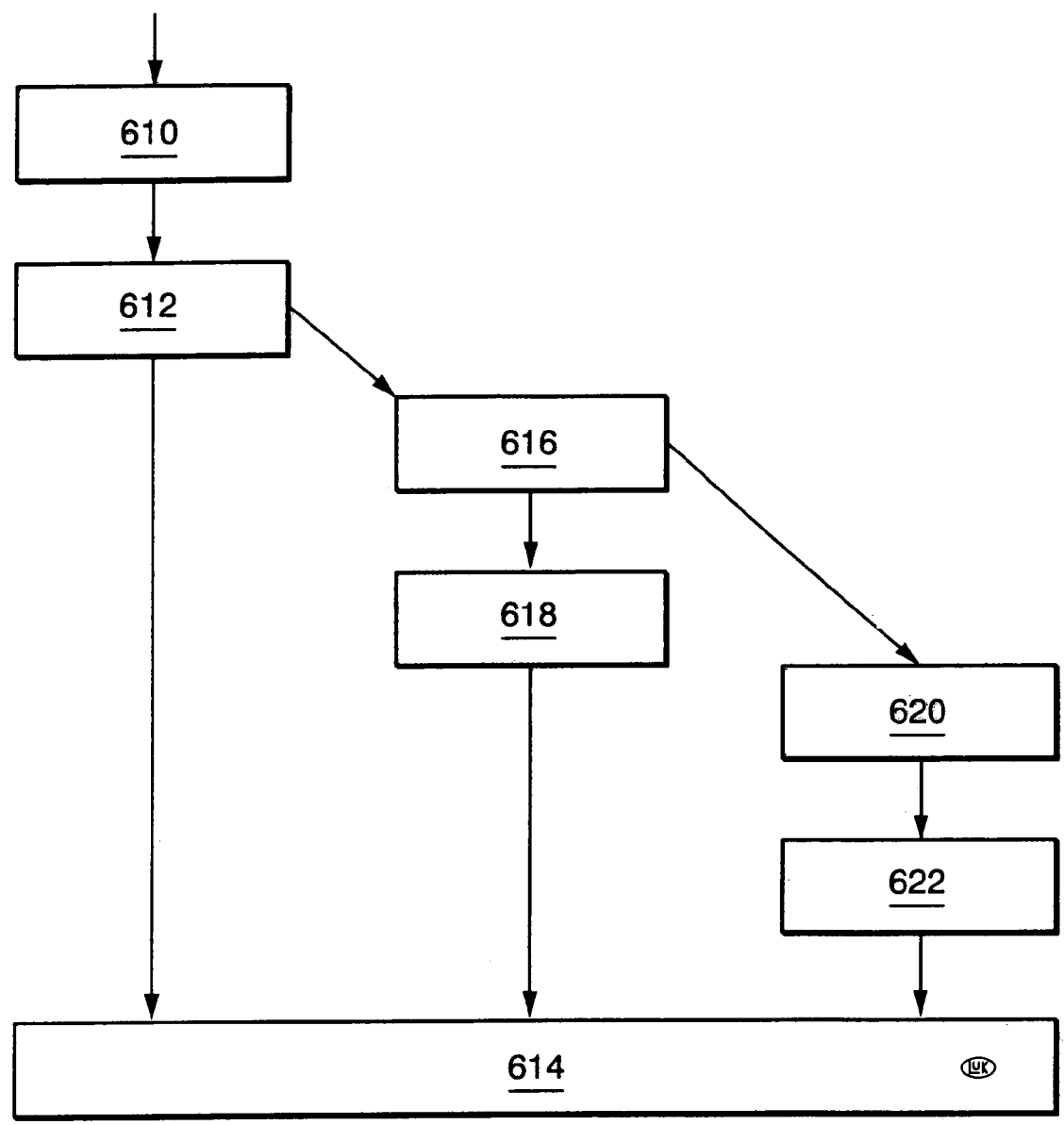
FIG. 13 a $13^{th}$ exemplary embodiment of the invention in a diagrammatic partial view.

FIG. 13 shows a 13$^{th}$ exemplary embodiment of the invention in a diagrammatic, partial view.

If the necessity of neutral reference movement has been established, i.e., when it is determined during driving that with an engaged clutch the engine rotational speed and the vehicle speed are not in agreement with the gear that is supposed to be engaged, for example, then a neutral reference movement is initiated in step 610. If it is then determined that the vehicle condition is not dangerous, i.e., when it has been established that a neutral reference movement will not result in any damage, particularly to the transmission, and/or preferably when the vehicle is standing still, then in step 612 a tactile process toward the left is initiated, followed by a tactile process toward the right. If the width, i.e., the maximum distance between the left point that has been determined in this way and the right point that has been determined in this way, is greater than a predetermined width, it can be deduced that the selector finger is located in the selection passageway. Since the LR tactile process concluded with a tactile movement to the right, in step 614 it can be determined whether or not the neutral gear is engaged on the right end.

If, however, it is found following the LR tactile process that the determined width is smaller than a predetermined width, then in step 616 a F-tactile process is initiated, with simultaneous R-pressing. If no stop is detected via this process, or if a pressing to the right is successful, i.e., movement to the right is detected, then a RLR tactile process is initiated in step 618. This RLR tactile process serves especially for control purposes. If, during this RLR tactile process, the width and/or the distance that is detected between the farthest point to the left and the farthest point to the right exceeds a predetermined width, it can be concluded that the selector finger is located in the selection passageway. It can further be concluded that a lower gear was engaged prior to that point. Since the RLR tactile process concluded with a tactile movement to the right, in step 614 it can be determined whether or not the right end of the neutral gear is engaged.

In cases in which it has been found or concluded via step 616 that a stop has been detected, which here would mean that an upper gear is engaged, and/or when it can be established via step 618 that the detected width is smaller than a predetermined width, i.e., the selector finger is located in a shift passageway, then an H-tactile process with a simultaneous L-pressing process is initiated in step 620. If no stop is detected, or if pressing to the left is successful, i.e., a traversing movement to the right is recognized, then a LR tactile process for control purposes is introduced in step 622.

If the distance between the left and the right points, and/or the width, that is detected exceeds a predetermined width, it can be concluded that the selector finger is located in the selection passageway and it can then be established in step 614 that the neutral gear is engaged at the right end.

Figure 14:
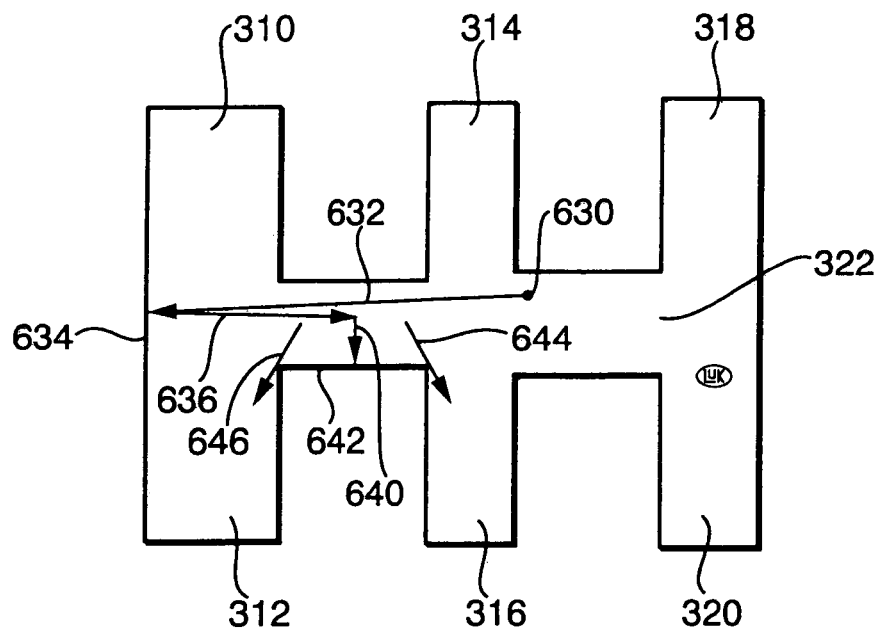
FIG. 14 a $14^{th}$ exemplary embodiment of the invention in a diagrammatic partial view.

FIG. 14 depicts a selection-shift-passageway layout in which travel movements of the selector finger, not shown, are clarified, which can be initiated especially for the purpose of detecting the neutral gear position and/or an absolute position in the shift direction within the framework of and/or in the presence of a neutral reference movement.

Starting from an unknown selector finger position 630 in the shift direction, the selector finger, not shown, is moved especially along the arrow 632 in the selection passageway 322 toward a passageway wall 634 located at an end of the selection passageway 322. When the selector finger reaches passageway wall 634, which is detected via an indirect process, the selector finger is moved back in the opposite direction of the selection passageway a predetermined distance along the arrow 636, in the selection direction. This predetermined distance is measured such that, at the end of this movement, the selector finger, oriented in the selection direction, is located basically at the center between the shift passageways 310 and 314 and/or 312 and 316. The selector finger is then moved in the shift direction, i.e., along the arrow 640, up to a region of the longitudinal wall 642. This position can be used for alignment in the shift direction.

In order to prevent any sideways slippage, especially in the direction of the arrow 644 or in the direction of the arrow 646, into a shift passageway, i.e., especially into the shift passageway 312 or the shift passageway 316, the selection passageway position is monitored. If the selection passageway position does not remain the same during movement in the direction of the longitudinal wall 642, the danger of sideways slippage exists.

Figure 15:
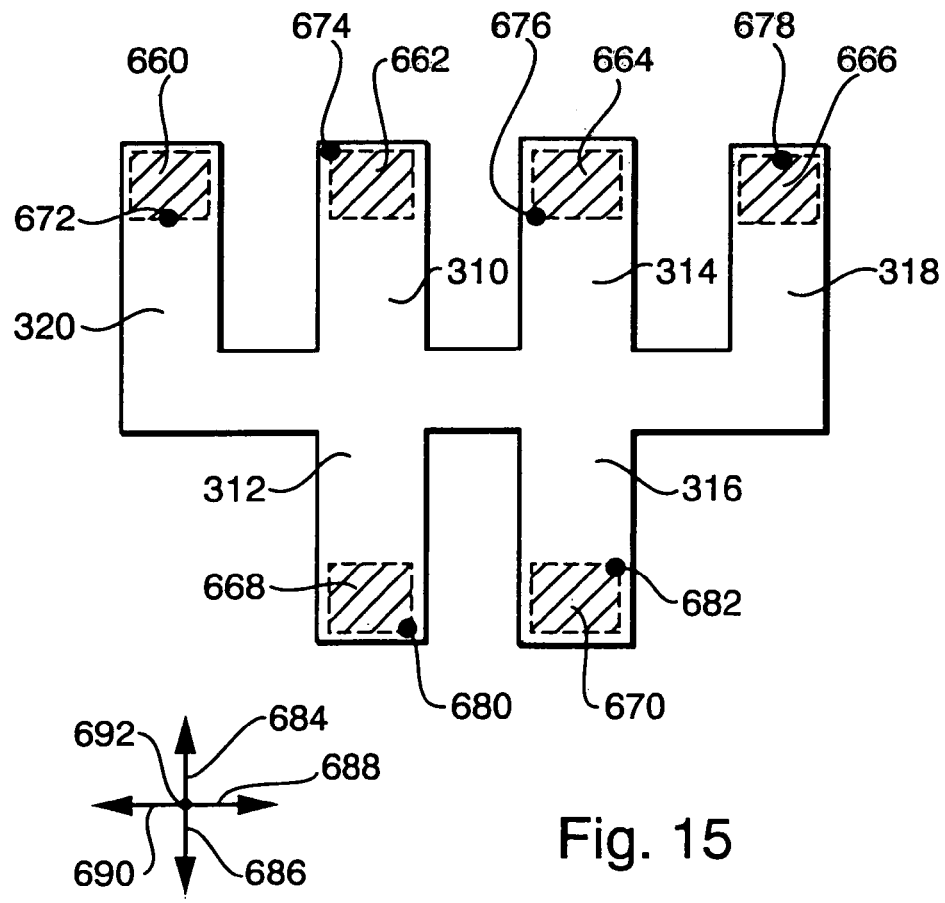
FIG. 15 a $15^{th}$ exemplary embodiment of the invention in a diagrammatic partial view.

FIG. 15 depicts a selection-shift-passageway layout.

The gear end positions 660, 662, 664, 666, 668, 670 are designed such that a selector finger, not shown, can be arranged within them, allowing for clearance in the selection direction and in the shift direction.

When the gears are engaged, the selector finger is positioned in predetermined selector finger positions 672, 674, 676, 678, 680, 682, which are allocated to the respective gears, in accordance with a predetermined coding characteristic. Those positions differ in accordance with a predetermined characteristic value.

Especially in a gear end position 660, the selector finger is positioned at the rear in the center; in a gear end position 662 the selector finger is positioned at the front to the left; in a gear end position 664 the selector finger is positioned at the rear to the left; in a gear end position 666 the selector finger is positioned at the front in the center; in a gear end position 668 the selector finger is positioned to the rear at the right; in a gear end position 670 the selector finger is positioned at the front to the right. The directional information corresponds in particular to that of the arrow cross, wherein the arrow 684 represents the forward direction, the arrow 686 represents the rear direction, the arrow 688 represents the right direction, the arrow 690 represents the left direction, and the point 692 represents the center.

In order to decode the gear position information, the selector finger can be moved with traversing movements to the left and/or right, and to the front and/or rear, within the gear end positions so that, based upon the movement pathways, a conclusion can be drawn about the engaged gear.

Figure 16:
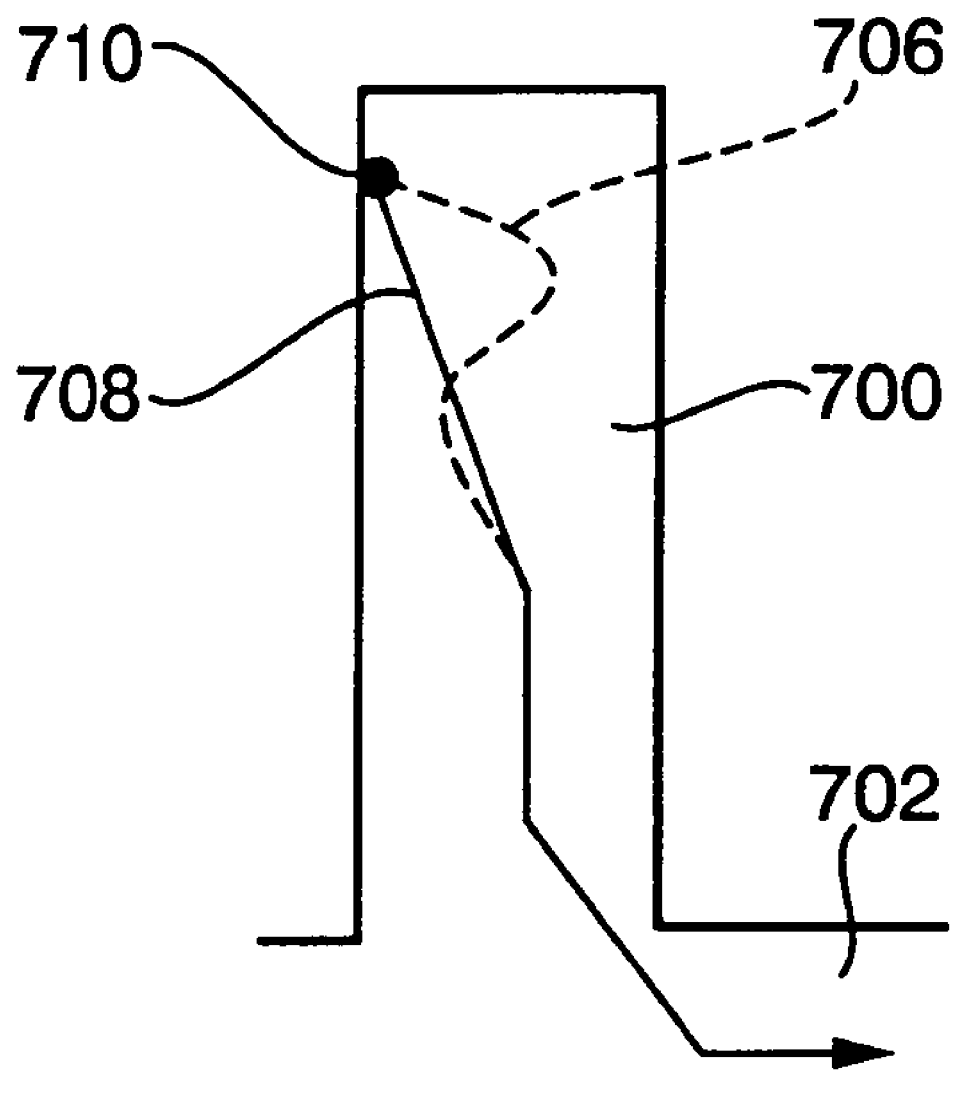
FIG. 16 a $16^{th}$ exemplary embodiment of the invention in a diagrammatic partial view.

FIG. 16 depicts a shift passageway 700 and a selection passageway 702. The lines 708 and 706 represent two examples of movement paths, along which the selector finger, not shown, can be displaced within the shift passageway 700 for the purpose of checking a selection motor or its position sensor. Those paths 706, 708 are especially characterized in that the movement occurs not only in the shift direction, but also has a component in the selection direction within the shift passageway.

Monitoring the values indicated by the position sensor in the selection direction allows monitoring of correct functioning of the selection motor and/or its position detecting device.

The point 710 represents an example of a selector finger position in which the selector finger is in an engaged gear.

References employed in the sub-claims point to a further expansion of the object of the main claim through the features of the respective sub-claims; they should not be understood as a waiver for obtaining independent protection of the object for the combinations of features in the sub-claims to which reference is made.

Since the objects of the sub-claims can represent independent and autonomous inventions with regard to the state of the art on the priority date, the applicant reserves the right to make them the object of independent claims or partial declarations. Furthermore, they can contain independent inventions, which exhibit a design that is independent from the objects of the previous sub-claims.

The exemplary embodiments should not be understood as a limitation of the invention. Within the framework of the present disclosure, numerous alterations and modifications are possible, especially such variations, elements, and combinations and/or materials which can be deduced by experts in the field with regard to resolving the object, for example, via the combination or modification of individual features and/or elements or procedural steps in connection with those described in the claims and those contained in the drawings, and which lead to a new object or new procedural steps and/or procedural step sequences through features that can be combined, also to the extent that they relate to manufacturing, testing, and processing methods.

What is claimed is:

1. A transmission system with a shift mechanism for its actuation, said system comprising:
   a selection-shift-passageway layout within which a selector finger can be moved;
   at least one actuation device for controlling the selector finger;
   at least one position sensor for detecting the selector finger movement in a selection direction and in a shift direction;
   at least one selector shaft; and
   at least one device for establishing a neutral position of the transmission and that controls the selector finger such that the selector finger is moved along a path in a selection passageway that is substantially parallel to the selection passageway axis while incrementally approaching one of the longitudinal walls of the selection passageway, until the selector finger is deflected by the longitudinal wall that is parallel to the selection passageway axis, so that a boundary positioned longitudinally in the selection passageway is detected for a neutral transmission position.

2. A transmission system in accordance with claim 1, including at least one absolute position-detecting device that starting from an unknown position of the selector finger within the selection-shift-passageway layout, establishes at least one predetermined absolute position of the selector finger within the selection-shift-passageway layout.

3. A transmission system in accordance with claim 2, wherein the absolute position detecting device determines an absolute position of the selector finger, independently of actuating forces acting on the shift mechanism.

4. A transmission system in accordance with claim 2, including at least one sensor device and at least one signal region, wherein the sensor device detects a signal from the signal region, wherein the signal detected by the sensor device can have at least two different signal values depending upon the position of the signal region being sensed; wherein the signal region corresponds with a pattern that is projected onto the selection-shift-passageway layout and that includes a plurality of field-shaped regions, each of which is associated with a predetermined signal value; and wherein a signal course detected by the sensor device changes when the selector finger passes over a contact line defined by adjacent bordering regions.

5. A transmission system in accordance with claim 4, wherein the signal region is positioned on the selector shaft.

6. A transmission system in accordance with claim 4, wherein the sensor device is a digital sensor and the signal is a digital signal field.

7. A transmission system accordance with claim 4, wherein each of the field-shaped regions of the pattern is projected onto the selection-shift-passageway layout and is aligned substantially parallel to at least one of the axes of the passageways.

8. A transmission system in accordance with claim 7, wherein the pattern projected onto the selection-shift-passageway layout is configured so that an absolute position of one of the selector finger and a shaft of the actuation device can be determined within up to three movements of the selector finger.

9. A transmission system in accordance with claim 7, wherein within at least one of the passageways two regions of the pattern projected onto the selection-shift-passageway layout have different signal values associated therewith so that with a movement of the selector finger to and beyond its bordering contact line an absolute selection position can be determined.

10. A transmission system in accordance with claim 9, wherein within at least one of the passageways two of the regions of the pattern projected onto the selection-shift-passageway layout are associated with different signal values and are arranged such that with a movement of the selector finger near a region-bordering contact line an absolute shift position can be determined.

11. A transmission system in accordance with claim 4, wherein the at least one sensor device is selected from the group consisting of electromechanical calipers, Hall effect sensors, inductive sensors, optical sensors, capacitive sensors, sound sensor systems, and electric collectors based upon a collecting bar.

12. A transmission system in accordance with claim 4, wherein the signal region is arranged on the selector shaft in the form of surface elevations and surface recesses.

13. A transmission system in accordance with claim 4, including at least one evaluation device, which stores the position of the pattern projected onto the selection-shift-passageway layout, and which based on the position of this stored pattern and on the detected sensor values determines an absolute position in one of the selection direction and the shift direction.

14. A transmission system in accordance with claim 1, including at least one incremental distance sensor for the selection direction and at least one incremental distance sensor for the shift direction and which can be set at a predetermined time to a predetermined value, wherein a predetermined value from the incremental distance sensor can be allocated to an absolute position.

15. A transmission system in accordance with claim 4, wherein in at least one shift passageway in at least one predetermined position in the selection direction, two regions of the pattern that is projected onto the selection-shift-passageway layout and to which different signal values are allocated meet one another along a contact line that is aligned at least in part along the longitudinal axis of the at least one shift passageway.

16. A transmission system in accordance with claim 4, wherein in at least one of the shift passageways in at least one predetermined position in the shift direction, two regions of the pattern that is projected onto the selectionshift-passageway layout and to which different signal values are allocated, meet one another along a contact line that is aligned at least in part in a transverse direction of the at least one shift passageway.

17. A transmission system in accordance with claim 4, wherein in the selection passageway, in at least one predetermined position in the shift direction two regions of the pattern that is projected onto the selection-shift-passageway layout and to which different signal values are allocated, meet one another along a contact line that is aligned at least in part along the longitudinal axis of the selection passageway.

18. A transmission system in accordance with claim 4, wherein in the selection passageway in at least one predetermined position in the selection direction two regions of the pattern that is projected onto the selection-shift-passageway layout and to which different signal values are allocated, meet one another along a contact line that is aligned at least in part in a transverse direction of the selection passageway.

19. A transmission system with a shift mechanism for its actuation, said system comprising:
   a selection-shift-passageway layout within which a selector finger can be moved;
   at least one actuation device for controlling the selector finger;
   at least one position sensor for detecting selector finger movement in a selection direction and in a shift direction;
   at least one selector shaft; and
   at least one neutral reference device which starting from one unknown selector finger position determines a neutral gear position, wherein in establishing a neutral gear position based upon a shift pattern, controlled directions of movement of the selector finger are aligned such that a movement of the selector finger in predetermined critical shift passageways is prevented.

20. A transmission system in accordance with claim 19, wherein forces that are applied to the selector finger by the neutral reference device include a direction of the selection passageway, and directions that contain a vector component in the direction of the selection passageway and a vector component in the direction of the shift passageways; wherein each of those components does not equal zero and directions and orientations are ruled out which correspond with the direction and orientation of an arbitrary vector that is directed at any random point in the predetermined, critical shift passageway from any random point on the selection passageway that is located outside an intersecting region between the predetermined critical shift passageways and the selection passageway.

21. A transmission system in accordance with claim 19, wherein the predetermined critical shift passageways include a shift passageway of a $1^{st}$ gear and a shift passageway of a reverse gear.

22. A transmission system in accordance with claim 19, wherein the predetermined critical shift passageways are arranged in a double-H shifting diagram diametrically opposite one another and positioned outwardly within the diagram.

23. A transmission system in accordance with claim 19, wherein the neutral reference device begins to control the neutral gear position when one of detected actuation parameters contradict a detected gear when in the case of an engaged clutch, the detected gear does not coincide with a gear that has been calculated based upon engine rotational speed and vehicle speed; and unknown stops are detected in the transmission; and a position sensor is sensing erroneous signals; and during travel passageway position sensor information is not available; and predetermined components of the shift mechanism have been altered.

24. A transmission system in accordance with claim 19, wherein the neutral reference device initiates a neutral reference movement only when it has been determined that a motor vehicle with a transmission system has been found to be operating within predetermined operating conditions.

25. A transmission system in accordance with claim 19, wherein the neutral reference device initiates a neutral reference movement only when a throttle valve of a motor vehicle assumes a predetermined angle.

26. A transmission system in accordance with claim 19, wherein the neutral reference device prevents a gear from being engaged during a neutral reference movement.

27. A transmission system in accordance with claim 19, wherein the neutral reference device initiates a neutral reference movement only when a vehicle speed is below a predetermined vehicle speed.

28. A transmission system in accordance with claim 19, wherein during a neutral reference movement the neutral reference device performs tactile and pushing movements in accordance with a predetermined characteristic value, wherein a tactile movement corresponds with a movement of the selector finger that is continued until a predetermined condition is detected and wherein a pushing movement corresponds with a movement of the selector finger that is continued until a traversing movement relative to the movement direction is detected.

29. A transmission system in accordance with claim 19, wherein under predetermined error conditions a neutral reference movement is interrupted.

30. A transmission system in accordance with claim 19, wherein the neutral reference device detects a selector finger position in the shift direction after locating a selection passageway in accordance with a predetermined characteristic value.

31. A transmission system with a shift mechanism for its actuation, said system comprising:
   a selection-shift-passageway layout within which a selector finger can be moved;
   at least one actuation device for controlling the selector finger;
   at least one position sensor for detecting selector finger movement in a selection direction and in a shift direction;
   at least one selector shaft; and
   at least one geometry detection device that presses, pushes, and finally releases the selector finger under predetermined conditions relative to a predetermined stop so that the selector finger is in a substantially force-free position, and based upon that position and in accordance with a predetermined characteristic value a predetermined parameter of the transmission geometry can be determined.

32. A transmission system in accordance with claim 31, wherein the geometry detection device establishes at least one neutral gear position under predetermined conditions, wherein for the determination of a neutral gear position the selector finger is moved to a respective shift passageway end and is then pushed against the passageway end until an outside force applied to the selector finger is reduced, whereby resulting restoring forces cause the selector finger to be moved into a force-free position that in accordance with a predetermined characteristic value includes a predetermined position relative to the neutral gear position.

33. A transmission system in accordance with claim 31, wherein the geometry detection device presses and pushes the selector finger against a predetermined wall of the passageway layout and then releases it, so that at least one geometric characteristic of the selection-shift-passageway layout selected from the group consisting of a passageway wall position and a passageway width can be determined based upon the position of the selector finger after it has been released.

34. A transmission system in accordance with claim 31, wherein the geometry detection device responds to a signal from a passageway sensor by controlling the selector finger in accordance with a predetermined characteristic value, wherein the geometry detection device presses and pushes the selector finger at a predetermined position against a predetermined stop before releasing it, whereby resulting restoring forces cause the selector finger to assume a substantially force-free position that is used in initiating the incremental passageway sensor device.

35. A method for controlling a shift mechanism of a transmission system that includes a selection motor and a shift motor for controlling a selector finger that is movably mounted in a selection-shift-passageway layout and for examining a neutral position of the transmission system and for establishing predetermined wall positions of a selection passageway, said method comprising the following steps:
    moving the selector finger within the selection passageway in a selection direction along a first, predetermined length in a first, predetermined orientation;
    moving the selector finger in a shift direction by at least one increment in a second, predetermined orientation when the selector finger is not deflected by resistance in the shift direction during movement in the selection direction;
    moving the selector finger in the selection direction in a third direction with a third orientation over a third, predetermined distance;
    moving the selector finger in a fourth direction with a fourth orientation, by at least one increment when the selector finger is not deflected in the shift direction during movement in the selection direction; and
    repeating the above steps until during a movement of the selector finger in the selection direction continued movement in the selection direction is resisted before the selector finger has traversed the predetermined travel distance in the selection direction.

36. A method in accordance with claim 35, wherein the second direction and the fourth direction, and the second orientation and the fourth orientation, are identical.

37. A method in accordance with claim 35, wherein the first direction corresponds to the third direction, and the first orientation is opposite the third orientation.

38. A method in accordance with claim 35, wherein the predetermined distance in the selection direction corresponds substantially with the length of the selection passageway, at the latest following the second movement step, in which the selector finger is moved in the selection direction.

39. A method in accordance with claim 35, including the step of determining that a first boundary of the neutral position has been reached when during a control process that allows movement in the selection direction, the selector finger is deflected by resistance in the shift direction before reaching the predetermined distance of travel in the selection direction.

40. A method in accordance with claim 35, including the following steps:
    detecting a first boundary for the neutral position that extends along the longitudinal axis of the selection passageway, with that position arranged in a fifth position in the shift direction, relative to the center of the neutral passageway; and
    detecting a second boundary for the neutral position that extends along the longitudinal axis of the selection passageway, with that position arranged in a sixth position in the shift direction, relative to the center of the neutral passageway.

41. A method in accordance with claim 40, including the step of approaching a position within the selection passageway in the shift direction that the selector finger reached when the first limit of the neutral position was first detected, and after the first limit of the neutral position was detected.

42. A method for controlling a shift mechanism of a transmission system that includes a selection motor and a shift motor for controlling a selector finger that is movably mounted in a selection-shift-passageway layout, for determining and engaging the neutral gear position of the transmission system, said method comprising the following steps:
    implementing a neutral reference movement including a sequence of motor actuations and selector finger actuations that are specified in accordance with a predetermined neutral reference movement characteristic, whereby the selector finger can be moved into a neutral position that corresponds with the neutral gear, independently of the starting position of the selector finger;
    carrying out a predetermined sequence of tactile processes and pushing processes, wherein a tactile process includes supplying current to a motor until it is determined that the selector finger has hit a stop and/or a predetermined distance has been traveled, and wherein a pushing process includes supplying current to a motor until it is determined that the selector finger has moved in a direction of travel specified by the motor to determine a neutral reference movement characteristic value;
    wherein the tactile processes, the selection processes, and the combinations of tactile and selection processes are implemented only in predetermined directions based upon critical gears within the selection-shift-passageway layout that are predetermined based upon location.

43. A method in accordance with claim 42, wherein a tactile process in the shift direction is implemented only in conjunction with a pushing process in the selection direction.

44. A method in accordance with claim 42, wherein a predetermined condition for initiating a neutral reference movement exists when
    during travel it is determined that with an engaged clutch the engine rotational speed and the vehicle speed do not coincide with that for a gear that is recognized as being engaged; and
    it is determined that the controlled positions are not being approached correctly; and
    it is determined that in accordance with a predetermined characteristic value passageways of movement for the selector finger that are allocated to a predetermined position and are stored do not coincide with the actual passageway movements; and
    a control device for controlling one of the shift motor, the selection motor, and the selector finger has been switched off or reset; and components of the transmission system have been newly installed and/or replaced.

45. A method in accordance with claim 42, wherein a neutral reference movement is executed only when, in accordance with a predetermined characteristic value, and based upon at least one predetermined operating parameter for a motor vehicle, it has been ensured that neutral reference movement will not cause damage to the transmission system and that the motor vehicle is not in a predetermined operating mode that would have to be interrupted in order to execute the neutral reference movement.

46. A method in accordance with claim 42, wherein a neutral reference movement is interrupted when a condition exists within the group consisting of vehicle speed exceeding a predetermined vehicle speed, a kick-down operation exists, and the throttle valve angle is within a predetermined range.

47. A method in accordance with claim 42, wherein during a neutral reference movement one gear that is not equal to zero is prevented from shifting into another gear that is not equal to zero.

48. A method in accordance with claim 42, wherein the selection-shift-passageway layout is a double-H shift pattern in which a shift passageway that is allocated to the first gear is positioned on the top left of the pattern and the shift passageway that is allocated to the reverse gear is positioned on the bottom right of the pattern, and wherein during a neutral reference movement only tactile and pushing processes are performed in directions that include a direction oriented toward the left, a direction oriented toward the right, an overlap of a direction that is oriented downward by a direction that is oriented toward the left, and an overlap of a direction that is oriented upward by a direction oriented toward the right.

49. A method in accordance with claim 48, including the following steps:
   initiating a neutral reference movement under predetermined conditions;
      determining the passageways of movement in the selection direction by tactile processes in both orientations in the selection direction;
      determining that the neutral gear is engaged when the passageway of movement in the selection direction is greater than a predetermined value, and establishing that the selector finger is at the end of the selection passageway in whose direction the last tactile process occurred;
      conducting a tactile process in the forward shifting direction (F-tactile) with simultaneous pushing in the right selection direction (R-pushing) when the passageway of movement is smaller than a predetermined passageway of movement;
      conducting right-left-right tactile process (RLR-tactile) for purposes of control in the selection direction if no stop is detected, and if a pushing to the right is successful so that movement to the right is detected;
      establishing that a right end of the neutral gear is engaged when the passageway of movement in the selection direction that has been established within the framework of the RLR tactile process is greater than a predetermined value;
      conducting a rear tactile process (R-tactile) with simultaneous left pushing (L-pushing) when the movement in the shift direction that has been established in the RLR tactile process is below a predetermined value, or when a stop is detected during a F-tactile process with simultaneous R-pushing;
      conducting a LR-tactile process when during an R-tactile process with simultaneous L-pushing, no stop is detected, and if a pushing to the left is successful, so that a movement to the left can be detected;
      establishing that the right end of the neutral gear is engaged when the LR control tactile process has produced a movement that is greater than a predetermined movement;
   wherein
      a LR tactile process is a combination of a tactile process to the left followed by a tactile process to the right, a F-tactile process is a forward tactile process, a R-tactile process is a backward tactile process, a RLR tactile process is a combination of a tactile process to the right, followed by a tactile process to the left, and then a tactile process to the right, R-pushing is a pushing to the right, and L-pushing is a pushing to the left;
      left and right represent orientations in the selection direction;
      front and rear represent orientations in the shift direction; and
      the shift passageway of the first gear and the shift passageway of the reverse gear are positioned on the outside in the selection-shift-passageway layout, to one of the left front and the right rear.

50. A method in accordance with claim 42, including the step of repeating a reference movement in accordance with a predetermined characteristic value when predetermined errors are detected during the reference movement.

51. A method in accordance with claim 42, including the following steps:
   approaching an end position in the selection direction;
   approaching a predetermined position in the direction of the selection passageway after locating the selection passageway, wherein in accordance with a predetermined characteristic value it has been determined that within the region of that position no shift passageway joins the selection passageway; and
   moving in the shift direction to establish the stops on the selection passageway in the shift direction for establishing the neutral position in the shift direction.

52. A method in accordance with claim 51, including the step of monitoring the selection position during movement in the shift direction, so that the selector finger is not moved into a shift passageway as a result of slippage.

53. A method for controlling a shift mechanism of a transmission system that includes a selection motor and a shift motor for controlling a selector finger that is movably mounted in a selection-shift-passageway layout, for establishing at least one predetermined neutral position and for detecting a malfunction of a shift motor and of a selection motor and of a position sensor associated with the shift motor or the selection motor, said method comprising the following steps:
   moving the selector finger in the direction of at least one wall of a passageway;
   pushing the selector finger against a stop position defined by the passageway wall;
   reducing to zero the force applied to the selector finger by at least one motor, thereby causing the selector finger to be moved back in the direction of the passageway as a result of restoring forces of one of the selector finger and the shift fork, whereby the respective element, such as the selector finger, is then released from stress, and assumes a position within the passageway configuration, relative to the stop, that is predetermined;

detecting a reverse movement of the selector finger from its pushed position back to its unstressed position by a position sensor, especially by a position sensor that is arranged on a motor;

comparing the predetermined position with the final value of the position sensor; and establishing that one of the selection motor, the shift motor, a position sensor of the selection motor, and a position sensor of the shift motor exhibits a malfunction when a final value of the position sensor deviates more than a predetermined amount from the predetermined unstressed position of the selector finger.

54. A method in accordance with claim 53, wherein a stop is defined by a shift passageway wall that borders the neutral position.

55. A method for controlling a shift mechanism of a transmission system that includes a selection motor and a shift motor for controlling a selector finger that is movably mounted in a selection-shift-passageway layout, for detecting at least one neutral position, said method comprising the following steps:

moving the selector finger in the direction of a final stop within a shift passageway in accordance with a predetermined movement characteristic;

pushing the selector finger against the stop in accordance with a predetermined control characteristic;

reducing to zero the force with which the selector finger is controlled, in accordance with a predetermined characteristic value, so that the selector finger is pushed back within the shift passageway in the shift direction as a result of restoring forces of one of the selector finger and of a shift fork, and assumes a position in which it is substantially without stress; and establishing the location of the neutral position of the engaged gear relative to that position, in accordance with a predetermined characteristic allocation value in one of the selection direction and the shift direction.

56. A method for controlling a shift mechanism of a transmission system that includes a selection motor and a shift motor for controlling a selector finger that is movably mounted in a selection-shift-passageway layout, for determining the width of a predetermined passageway in a selection-shift-passageway layout, said method comprising the following steps:

controlling the selector finger in the direction of a longitudinal wall of a predetermined passageway, in accordance with a predetermined control characteristic;

pushing the selector finger against the wall in accordance with the predetermined characteristic value;

unloading the selector finger in accordance with a predetermined characteristic value, so that the selector finger is moved back in the direction of the passageway width as a result of restoring forces of one of the selector finger and a shift fork, whereby the selector finger comes to rest in a largely unstressed mode in a first predetermined position in the width direction of the passageway;

repeating the above steps in relation to a second wall of the passageway located on an opposite side of the passageway centerline; and determining the width of the passageway in accordance with a predetermined characteristic value, based upon the distance between unstressed selector finger positions.

57. A method in accordance with claim 56, wherein the passageway wall is detected by an indirect method by the detection of a standstill position of a motor based upon one of its position sensor, a force measurement, a measurement of armature current of a motor, and the time progression of predetermined operating parameters in comparison with a predetermined evaluation characteristic.

58. A method in accordance with claim 56, including the step of adapting predetermined stored positions of the selection-shift-passageway layout, based upon at least one detected unstressed selector finger position.

* * * * *